(12) United States Patent
Pikler et al.

(10) Patent No.: US 9,378,482 B1
(45) Date of Patent: Jun. 28, 2016

(54) EXCHANGE OF CONTAINERS

(71) Applicant: Amazon Technologies, Inc., Seattle, WA (US)

(72) Inventors: Tamas Pikler, Westford, MA (US); Fei Hoai Lee, Medford, MA (US); Jeremiah Brazeau, Hudson, NH (US); Jon Stuart Battles, North Bend, WA (US); Martin Peter Aalund, Seattle, WA (US); Jayson Michael Jochim, Seattle, WA (US); Gregory Karl Lisso, Seattle, WA (US); Samuel Christopher Uhlman, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/657,690

(22) Filed: Mar. 13, 2015

(51) Int. Cl.
G01C 22/00 (2006.01)
G06Q 10/08 (2012.01)
G06Q 30/06 (2012.01)
G05D 1/00 (2006.01)

(52) U.S. Cl.
CPC ............ *G06Q 10/087* (2013.01); *G05D 1/0088* (2013.01); *G06Q 30/0635* (2013.01)

(58) Field of Classification Search
None
See application file for complete search history.

(56) References Cited

U.S. PATENT DOCUMENTS 8,280,547 B2 10/2012 D'Andrea et al.
2009/0185884 A1* 7/2009 Wurman .............. B65G 1/1378
414/270
2012/0143427 A1 6/2012 Hoffman et al.

* cited by examiner

*Primary Examiner* — Adam Alharbi
(74) *Attorney, Agent, or Firm* — Kilpatrick Townsend & Stockton LLP

(57) ABSTRACT

A container exchange station is provided in connection with a workspace of an inventory system. At the container exchange station, containers are exchanged between container holders and container shuttles. The container holders are configured to hold one or more containers having consolidated inventory items in high density storage. The container shuttles are also configured to hold one or more containers for performing other operations with respect to inventory items in the one or more containers. The containers are configured to hold inventory items while the inventory items move for various operations throughout the workspace and while the inventory items are stowed in high density storage in the workspace.

20 Claims, 14 Drawing Sheets

EXCHANGE OF CONTAINERS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
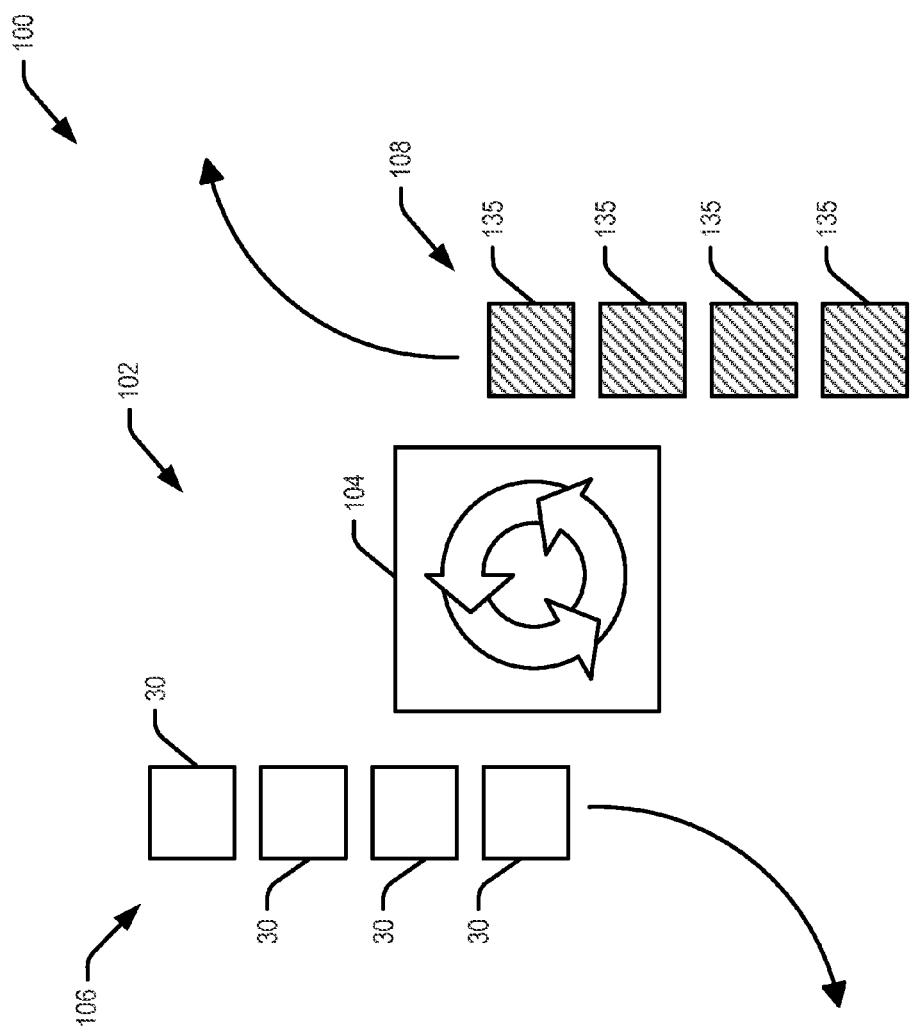
FIG. 1 illustrates an example diagram depicting techniques relating to managing movement of containers including inventory items as described herein, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple container holders and drive units for moving the container holders. Specifically, features herein are directed to managing movement of containers including inventory items within the inventory system. To this end, container holders and container shuttles are provided to retain containers. Mobile drive units are provided to move the container holders and the container shuttles among one or more locations of a facility (e.g., a warehouse) within the inventory system. The container holders are configured to removably receive one or more containers, and the containers are configured to hold inventory items. The container holders generally operate within a storage area of the facility and hold inventory items (within containers) going to or coming from the storage area. The container holders may be placed in the storage area next to other container holders to form one or more rows of dense storage. The storage area of the facility generally operates at maximum capacity, meaning that generally there is little to no empty space in the storage area that can be identified, found, and filled without first removing a container holder and/or containers. The container shuttles are similarly configured to removably receive one or more containers. In some examples, however, the capacity for receiving containers of the container holders may be greater than the capacity of the container shuttles. The container shuttles may generally operate within inventory processing areas of the facility. The inventory processing areas may include those areas of the facility where inventory is processed (e.g., receiving areas, picking areas, packing areas, shipping areas, consolidation areas, quality control areas, and any other suitable areas within the facility). To this end, the inventory processing areas may be separate from the storage area and a container exchange area. For example, the container shuttles may hold containers of inventory and may be moved between container exchange stations (within a container exchange area) and any of the inventory processing areas of the facility (e.g., receiving stations within a receiving area). The container exchange area may be located adjacent or between the storage area and the inventory processing areas such that container holders may be moved between the container exchange area and the storage area, while container shuttles are moved between the container exchange area and the inventory processing areas. At a container exchange station, one or more containers may be exchanged between the container holders and the container shuttles. The containers on the container holders and/or the container shuttles may include various types of inventory items designated for different areas within the facility. The use of container shuttles, coupled with the container exchange stations, may improve efficiency of movement of inventory within the inventory system. This may include allowing the inventory system to operate at maximum capacity.

In one example, a container exchange station is located within a facility. The container exchange station is a physical location where identified containers including inventory items can be swapped for other containers. The container exchange station therefore includes an inventory queue, a shuttle queue, and an exchange area disposed between the two queues. In the inventory queue is included container holders which include a container to be exchanged. In the shuttle queue is included container shuttles which also include a container to be exchanged. An operator is located within the exchange area and receives instructions via a user device regarding which containers to exchange between the container holder and the container shuttle. For example, in response to receiving a customer order for an item, a container holder, which includes a number of containers, is moved by a mobile drive unit from a storage area to the inventory queue. One of the containers of the container holder includes the item associated with the customer order (i.e., an outbound item). Meanwhile, a container shuttle is moved by a different mobile drive unit from a receiving area to the shuttle queue. The container shuttle includes a number of containers, at least one of which includes inventory items that are to be stored in a container holder within the storage area (i.e., inbound items). When the container holder and the container shuttle are presented at the exchange area, the container including the outbound item is removed from the container holder and placed on the container shuttle. Similarly, the container including the inbound items is removed from the container shuttle and placed on the container holder. In this manner, the two containers are effectively swapped between the container holder and the container shuttle.

Turning now to the figures, FIG. 1 illustrates diagram 100. The diagram 100 includes a container exchange station 102. The container exchange station 102 may include an exchange area 104, an inventory queue 106, and a shuttle queue 108. Within the exchange area 104 may be located any suitable configuration of operators (e.g., human or automated), devices (e.g., computers, imaging devices, scanners, user devices), and systems (e.g., inventory conveyance systems) to facilitate the exchange of containers between container holders 30 and container shuttles 135. The container holders 30 and the container shuttles 135, which each hold containers, are moved to the container exchange station 102 by mobile drive units (not shown). In some examples, the containers are instead moved to the container exchange station using some other device or system, for example, by using an inventory conveyance system. In any event, once the containers are located at the container exchange station 102, certain containers can be removed and exchanged. This may include a computerized system determining which containers should be removed from which container holders 30, which containers should be removed from which container shuttles 135, and which containers should be replaced in one or more of the container holders 30 and container shuttles 135. In this manner and as described herein, containers of inventory items can efficiently move throughout an inventory system in which the container exchange station 102 is included.

Figure 2:
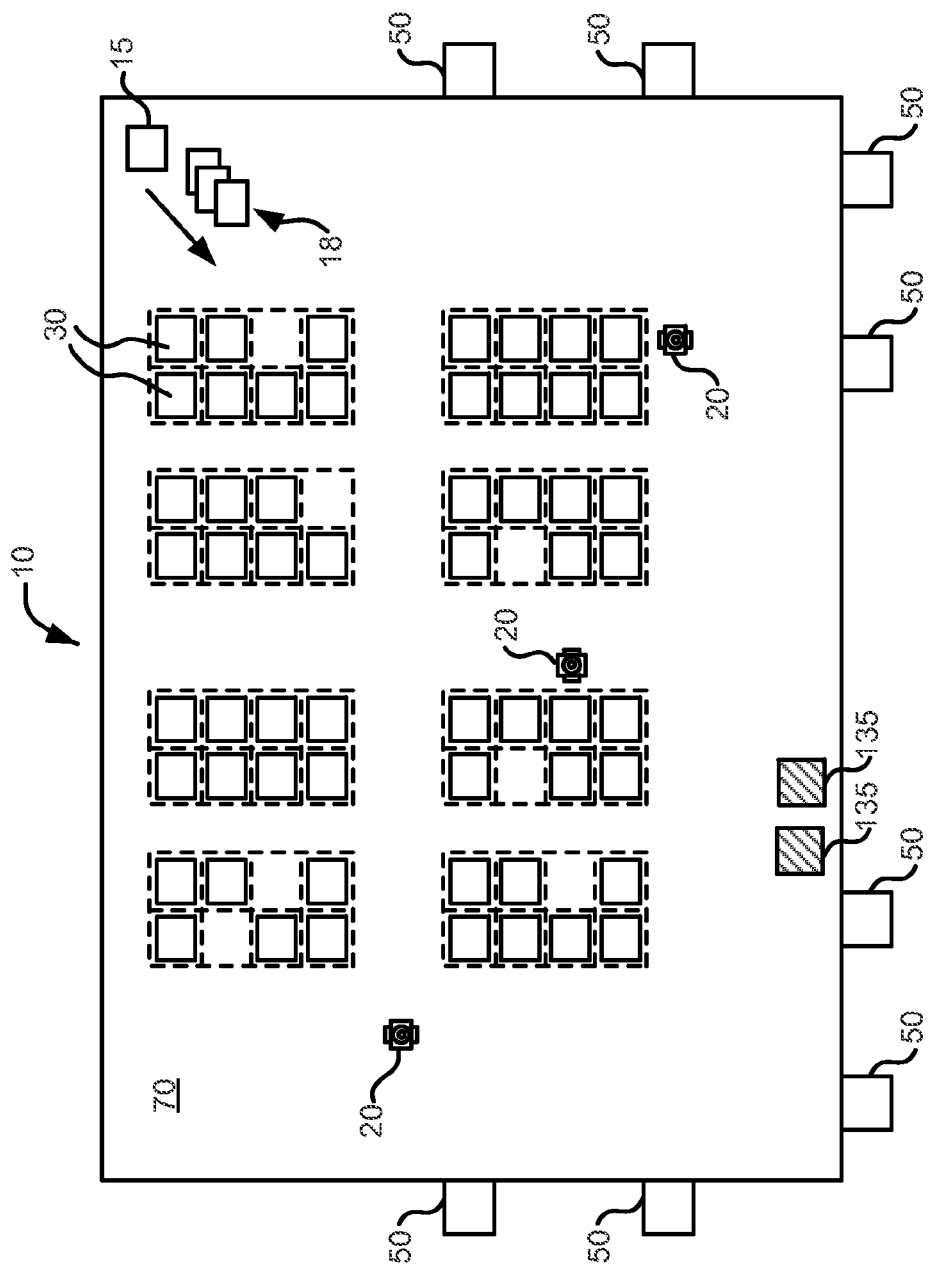
FIG. 2 illustrates components of an inventory system, in accordance with at least one embodiment.

FIG. 2 illustrates the contents of an inventory system 10. Inventory system 10 includes a management module 15, one or more mobile drive units 20, one or more container holders 30, one or more container shuttles 135, and one or more inventory stations 50. Mobile drive units 20 transport container holders 30 between points within a workspace 70 in response to commands communicated by management module 15. Each container holder 30 stores one or more containers. Each container may store one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of container holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

The discussion herein regarding container holders 30 is equally applicable to the container shuttles 135. Mobile drive units 20 move container holders 30 between locations within workspace 70. Mobile drive units 20 may represent any devices or components appropriate for use in inventory system 10 based on the characteristics and configuration of container holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move container holders 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected container holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Container holders 30 store inventory items within containers. In a particular embodiment, container holders 30 include multiple storage shelves with each storage shelf capable of holding one or more containers. Within each container may be held one or more types of inventory items. Container holders 30 are capable of being carried, rolled, and/or otherwise moved by mobile drive units 20. In particular embodiments, container holder 30 may provide additional propulsion to supplement that provided by mobile drive unit 20 when moving container holder 30. In some examples, container holders 30 store inventory items within one or more storage bins.

Additionally, in particular embodiments, inventory items 40 may also hang from hooks or bars (not shown) within or on container holder 30. In general, container holder 30 may store inventory items 40 in any appropriate manner within container holder 30 and/or on the external surface of container holder 30.

Additionally, each container holder 30 may include a plurality of faces. In some examples, each container may be accessible through one or more faces of the container holder 30. For example, in a particular embodiment, container holder 30 includes four faces. In such an embodiment, containers located at a corner of two faces may be accessible through either of those two faces, while each of the other containers is accessible through an opening in one of the four faces. Mobile drive unit 20 may be configured to rotate container holder 30 at appropriate times to present a particular face and the containers accessible from that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular container holder 30 is currently "storing" a particular inventory item if the container holder 30 currently holds one or more units of that type. As one example, inventory system 10 may represent a mail order warehouse facility, and inventory items may represent merchandise stored in the warehouse facility. During operation, mobile drive units 20 may retrieve container holders 30 containing one or more inventory items requested in an order to be packed for delivery to a customer or container holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items and/or containers from container holders 30 and/or container shuttles 135, the introduction of inventory items and/or containers into container holders 30 and/or container shuttles 135, the counting of inventory items and/or containers in container holders 30 and/or container shuttles 135, the decomposition of inventory items (e.g. from pallet- or case-sized groups to individual inventory items) into containers in container holders 30 and/or container shuttles 135, the consolidation of inventory items and/or containers between container holders 30 and/or container shuttles 135, transfer of inventory items and/or containers between container holders 30 and/or container shuttles 135, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or container holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and container holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), located across more than one floor, or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component.

These tasks may relate to the retrieval, storage, replenishment, and counting of inventory items and/or the management of mobile drive units 20, container holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of a container holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks, mobile drive units 20 may dock with and transport container holders 30 within workspace 70. Mobile drive units 20 may dock with container holders 30 by connecting to, lifting, and/or otherwise interacting with container holders 30 in any other suitable manner so that, when docked, mobile drive units 20 are coupled to and/or support container holders 30 and can move container holders 30 within workspace 70. While the description below focuses on particular embodiments of mobile drive unit 20 and container holder 30 that are configured to dock in a particular manner, alternative embodiments of mobile drive unit 20 and container holder 30 may be configured to dock in any manner suitable to allow mobile drive unit 20 to move container holder 30 within workspace 70. Additionally, as noted below, in particular embodiments, mobile drive units 20 represent all or portions of container holders 30. In such embodiments, mobile drive units 20 may not dock with container holders 30 before transporting container holders 30 and/or mobile drive units 20 may each remain continually docked with a particular container holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
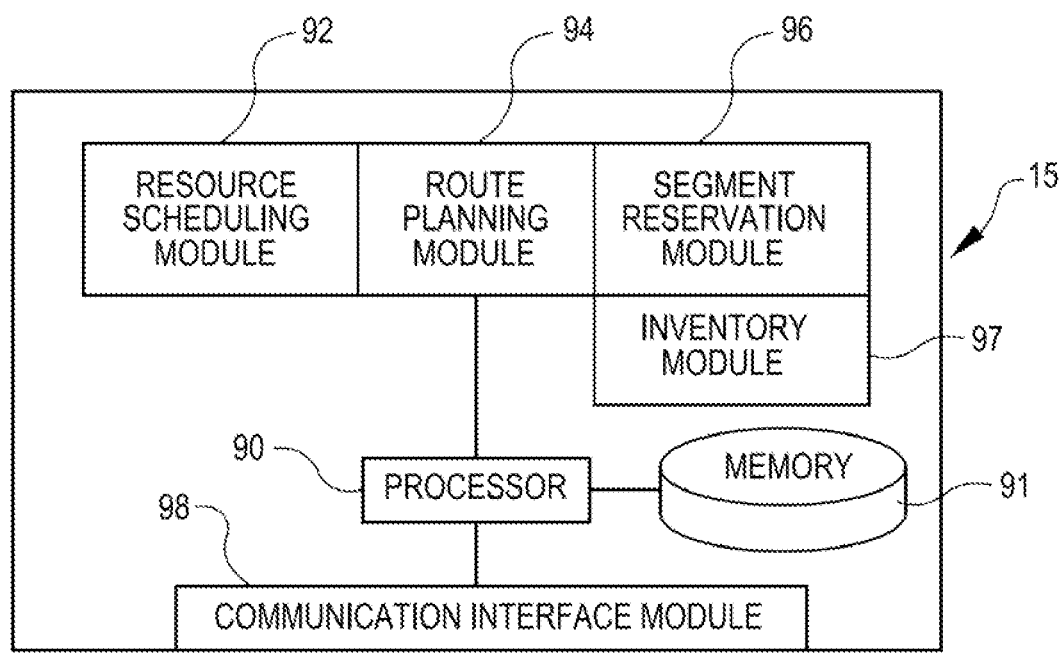
FIG. 3 illustrates in greater detail components of an example management module that may be utilized in particular embodiments of the inventory system as described herein, in accordance with at least one embodiment.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or non-volatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular container holder 30, and the maintained information can include the location of those inventory items 40 in the container holder 30. The inventory module 97 can also communicate with the mobile drive units 20, utilizing task assignments 18 to maintain, replenish or move inventory items 40 within the inventory system 10. In a particular embodiment, the inventory module 97 can coordinate the transfer of containers between container holders 30 and other locations where container 60 can be held. For example, the inventory module 97 may be configured to provide human-readable and/or machine-readable instructions to operators, whether human, automated, or otherwise, identifying containers within container holders 30 that are to be transferred.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
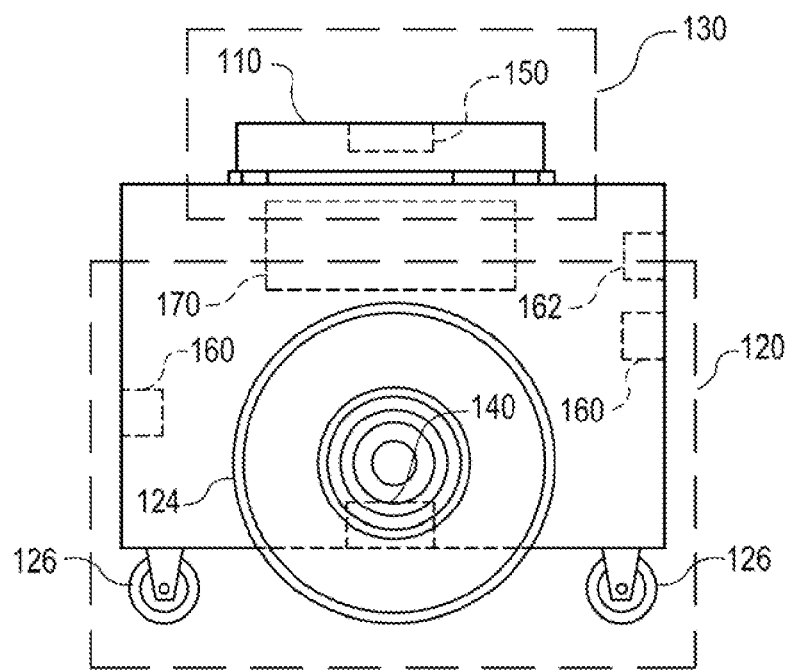
FIGS. 4 and 5 illustrate in greater detail an example mobile drive unit that may be utilized in particular embodiments of the inventory system as described herein, in accordance with at least one embodiment.
Figure 5:
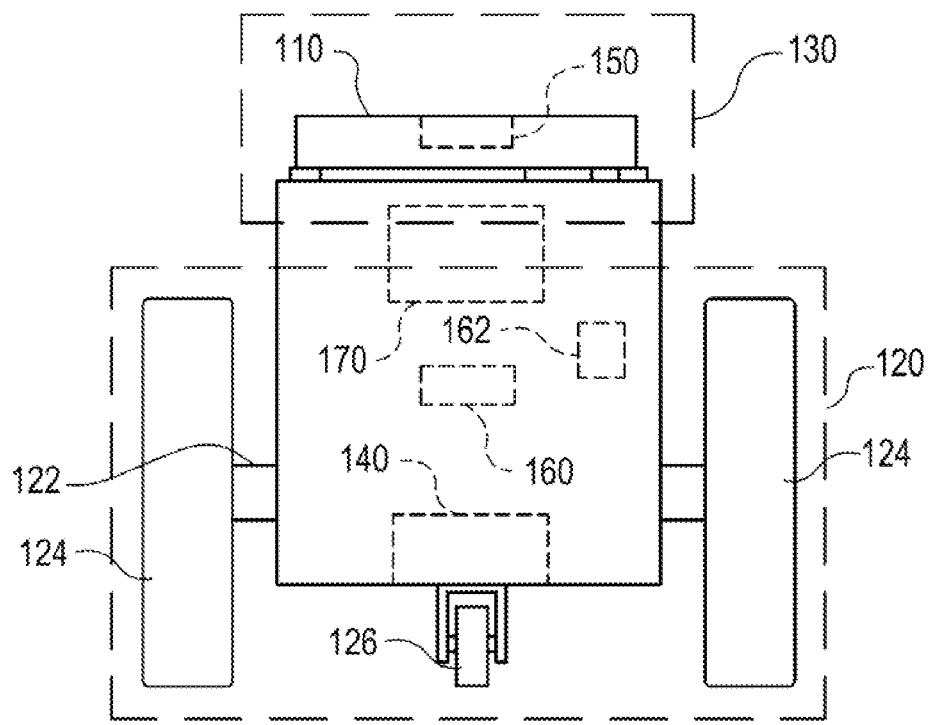

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, container holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to container holder 30 and/or supports container holder 30 when mobile drive unit 20 is docked to container holder 30. Docking head 110 may additionally allow mobile drive unit 20 to maneuver container holder 30, such as by lifting container holder 30, propelling container holder 30, rotating container holder 30, and/or moving container holder 30 in any other appropriate manner. Docking head 110 may also include any appropriate combination of components, such as ribs, spikes, and/or corrugations, to facilitate such manipulation of container holder 30. For example, in particular embodiments, docking head 110 may include a high-friction portion that abuts a portion of container holder 30 while mobile drive unit 20 is docked to container holder 30. In such embodiments, frictional forces created between the high-friction portion of docking head 110 and a surface of container holder 30 may induce translational and rotational movement in container holder 30 when docking head 110 moves and rotates, respectively. As a result, mobile drive unit 20 may be able to manipulate container holder 30 by moving or rotating docking head 110, either independently or as a part of the movement of mobile drive unit 20 as a whole.

Drive module 120 propels mobile drive unit 20 and, when mobile drive unit 20 and container holder 30 are docked, container holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards container holder 30 to facilitate docking of mobile drive unit 20 and container holder 30. Docking actuator 130 may also be capable of adjusting the position or orientation of docking head 110 in other suitable manners to facilitate docking. Docking actuator 130 may include any appropriate components, based on the configuration of mobile drive unit 20 and container holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with container holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting container holder 30 and/or determining, in any appropriate manner, the location of container holder 30, as an absolute location or as a position relative to mobile drive unit 20. Holder sensor 150 may be capable of detecting the location of a particular portion of container holder 30 or container holder 30 as a whole. Mobile drive unit 20 may then use the detected information for docking with or otherwise interacting with container holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of container holders 30. As another example, mobile drive unit 20 may represent part of an overhead crane system in which one or more crane assemblies are capable of moving within a network of wires or rails to a position suitable to dock with a particular container holder 30. After docking with container holder 30, the crane assembly may then lift container holder 30 and move inventory to another location for purposes of completing an assigned task.

Furthermore, in particular embodiments, mobile drive unit 20 may represent all or a portion of container holder 30. Container holder 30 may include motorized wheels or any other components suitable to allow container holder 30 to propel itself. As one specific example, a portion of container holder 30 may be responsive to magnetic fields. Inventory system 10 may be able to generate one or more controlled magnetic fields capable of propelling, maneuvering and/or otherwise controlling the position of container holder 30 as a result of the responsive portion of container holder 30. In such embodiments, mobile drive unit 20 may represent the responsive portion of container holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of container holders 30.

Figure 6:
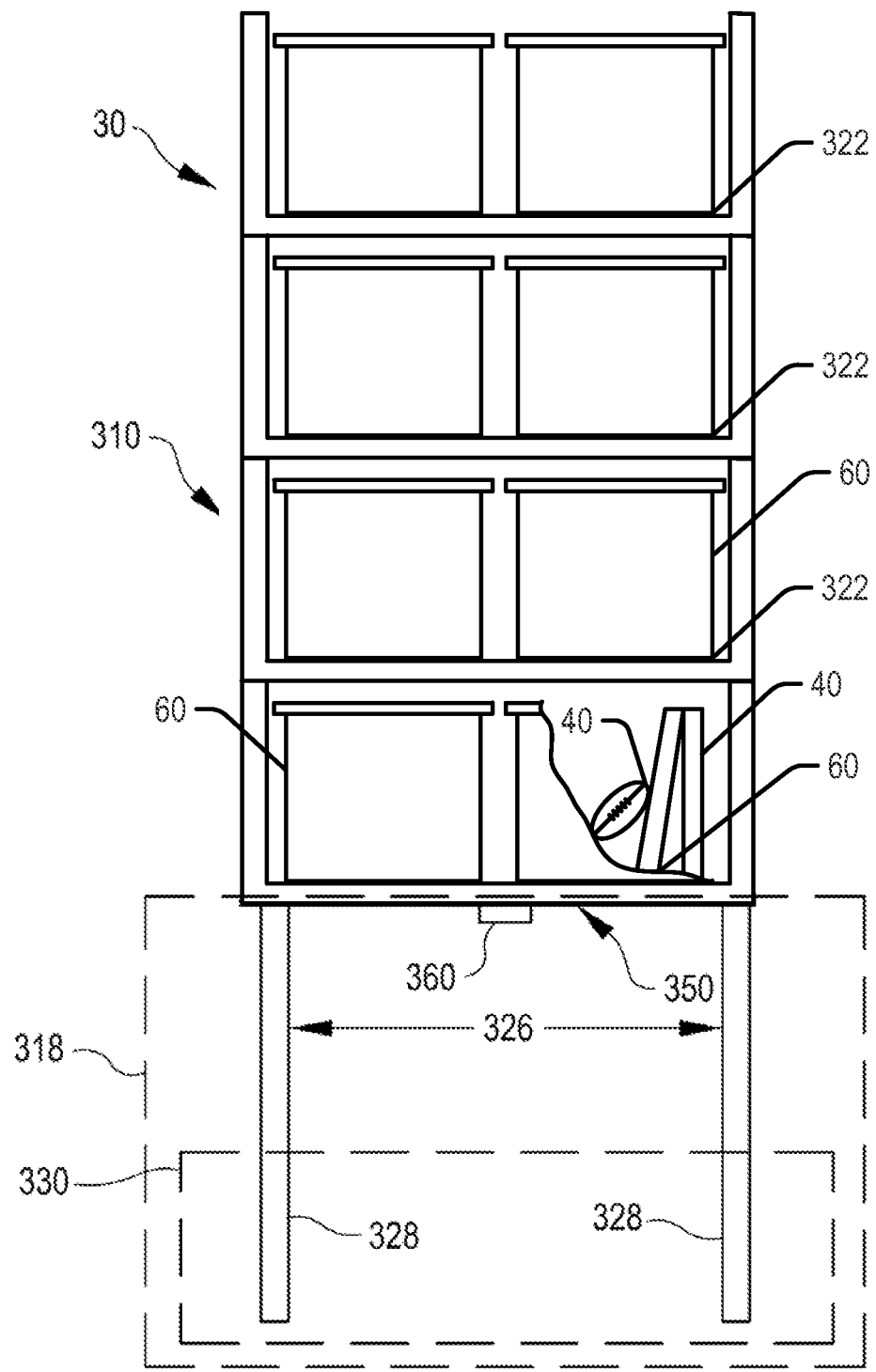
FIG. 6 illustrates in greater detail an example container holder that may be utilized in particular embodiments of the inventory system as described herein, in accordance with at least one embodiment.

FIG. 6 illustrates in greater detail the components of a particular embodiment of container holder 30. In particular, FIG. 6 illustrates the structure and contents of one side of an example container holder 30. In a particular embodiment, container holder 30 may comprise any number of faces with similar or different structure. As illustrated, container holder 30 includes a frame 310, a plurality of legs 328, and a docking surface 350.

Frame 310 holds inventory items within containers 60. Frame 310 provides storage space for storing containers 60 internal to frame 310. In a particular embodiment, frame 310 is composed of a plurality of inventory shelves 322 stacked upon one another and attached to or stacked on a base 318. In alternative embodiments, frame 310 may represent a single inventory shelf 322 configured to receive containers 60. Additionally, in particular embodiments, frame 310 may represent a load-bearing surface mounted on mobility element 330. Inventory items 40 may be stored on such a container holder 30 by being placed on frame 310. In general, frame 310 may include internal and/or external storage space divided into any appropriate number of inventory shelves 322 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or container holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of container holder 30 that couples to, abuts, and/or rests upon a portion of docking head 110, when mobile drive unit 20 is docked to container holder 30. Additionally, docking surface 350 supports a portion or all of the weight of container holder 30 while container holder 30 is docked with mobile drive unit 20. The composition, shape, and/or texture of docking surface 350 may be designed to facilitate maneuvering of container holder 30 by mobile drive unit 20. For example, as noted above, in particular embodiments, docking surface 350 may comprise a high-friction portion. When mobile drive unit 20 and container holder 30 are docked, frictional forces induced between docking head 110 and this high-friction portion may allow mobile drive unit 20 to maneuver container holder 30. Additionally, in particular embodiments, docking surface 350 may include appropriate components suitable to receive a portion of docking head 110, couple container holder 30 to mobile drive unit 20, and/or facilitate control of container holder 30 by mobile drive unit 20.

Holder identifier 360 marks a predetermined portion of container holder 30 and mobile drive unit 20 may use holder identifier 360 to align with container holder 30 during docking and/or to determine the location of container holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of container holder 30 as a whole. For example, in particular embodiments, holder identifier 360 may represent a reflective marker that is positioned at a predetermined location on container holder 30 and that holder sensor 150 can optically detect using an appropriately-configured camera.

Depending on the configuration and characteristics of mobile drive unit 20 and inventory system 10, mobile drive unit 20 may move container holder 30 using a variety of appropriate methods. In a particular embodiment, mobile drive unit 20 is capable of moving container holder 30 along a two-dimensional grid, combining movement along straight-line segments with ninety-degree rotations and arcing paths to transport container holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in container holder 30. For example, mobile drive unit 20 may rotate container holder 30 to present a particular face of container holder 30 to an operator of inventory system 10 or other suitable party, such as a packer selecting inventory items 40 from container holder 30. Mobile drive unit 20 may also undock from container holder 30. Alternatively, instead of undocking at the second location, mobile drive unit 20 may transport container holder 30 back to the first location or to a third location after any appropriate actions have been taken involving inventory items 40. For example, after a particular container 60 has been removed from container holder 30, mobile drive unit 20 may return container holder 30 to its original storage location, a new storage location, or another inventory station. Mobile drive unit 20 may then undock from container holder 30 at this new location.

Figure 7:
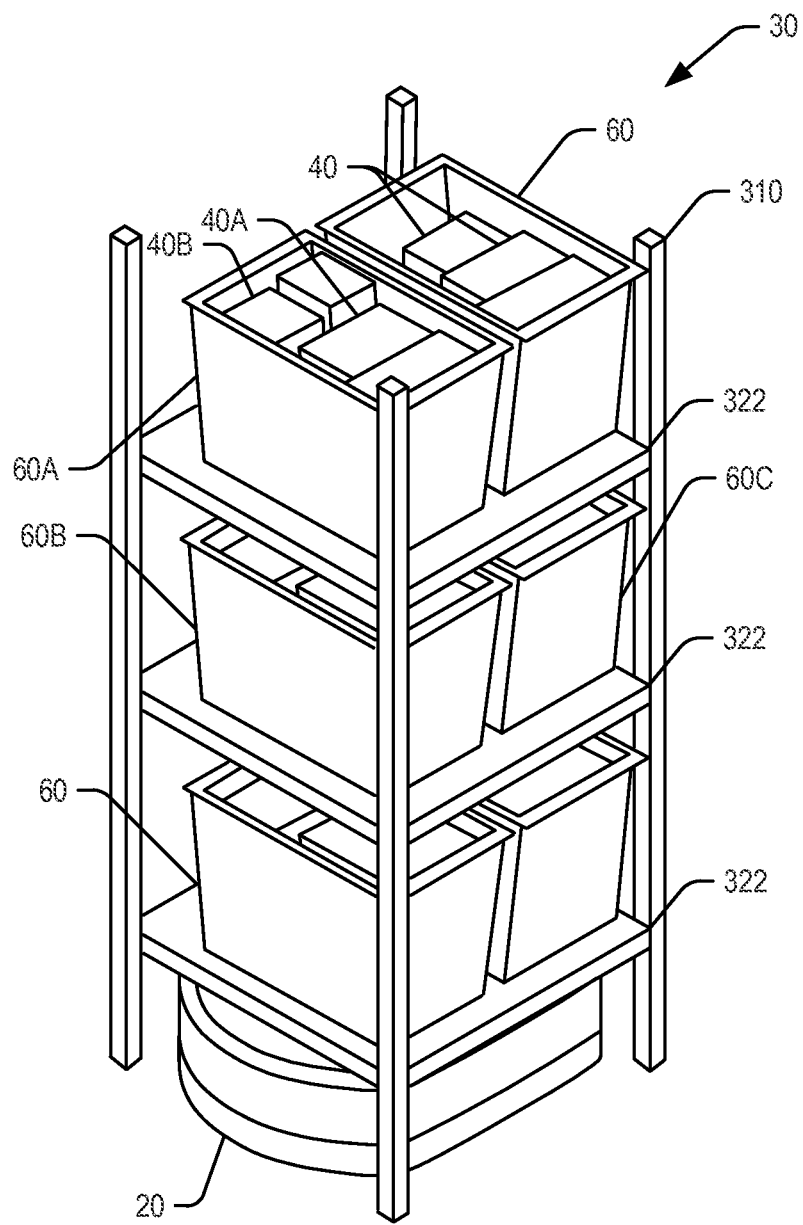
FIG. 7 illustrates in greater detail an example container holder that may be utilized in particular embodiments of the inventory system as described herein, in accordance with at least one embodiment.

FIG. 7 illustrates in greater detail the components of a particular example of the container holder 30 and components of a particular example of the containers 60. In particular, FIG. 7 illustrates the structure and contents of a perspective view of an example container holder 30. In this example, the container holder 30 is shown detachably coupled to the mobile drive unit 20. The container holder 30 may include the frame 310 and one or more shelves 322. On each shelf 322 is illustrated two containers 60. In some examples, the shelves 322 are configured to removably receive greater or fewer containers 60 than illustrated. The container holder 30 may be configured primarily for storing the containers 60 which include inventory items 40 being stored as inventory. Thus, the mobile drive unit 20 may be configured to move the container holder 30 to and from a storage area of the workspace 70. In some examples, the container holder 30 may be optimized for storing the containers 60 and may enable high density storage of inventory within the containers 60. For example, the one or more shelves 322 of the container holder 30 may be sized to receive the containers 60 with very little additional space on any side or above each container 60, such that the container holder 30 may receive containers 60 full of inventory items and thereby provide high density storage. This may include storing inventory for an indefinite duration.

When an inventory item 40 stowed in one of the containers 60 held by the container holder 30 is requested (e.g., in a customer order), the mobile drive unit 20 may move the container holder 30 to another location in the workspace. For example, the mobile drive unit 20 may move the container holder 30 to the container exchange station 102 where the container 60 can be exchanged using the techniques described herein.

The container 60 may be configured to receive one or more inventory items 40 and store such inventory items 40. To this end, the container 60 may have a generally rectangular shape and include an opening. In some examples, the containers 60 have different shapes and/or do not have openings. In any event, the containers 60 may be constructed of any suitable material having rigid or semi-rigid characteristics. Such suitable materials include, for example, plastics, metals, paper products, woods, and any other suitable rigid or semi-rigid material.

The containers 60 may be organized according to type of inventory item 40. The container holder 30 may be configured to receive containers 60 that include different types of inventory items 40. For example, a particular container holder 30 may removably receive a first container 60B which holds outbound inventory items and a second container 60C which holds inbound inventory items.

In some examples, the containers 60 include different types of inventory items. In some examples, the "type" given to a particular inventory item may depend on how the particular inventory item is being treated within the inventory system 10. For example, an inventory item 40A is being held simply as "inventory" and may be considered a "stowed (or stored) inventory item." An inventory item 40B that is associated with a customer order may be considered "an outbound inventory item." The inventory item 40B may be considered an outbound inventory item because the inventory item 40B will shortly be picked from the container 60A and sent to the customer associated with the order. Thus, as illustrated in FIG. 7, the container 60A may be configured to hold inventory items 40 of different types. Generally speaking, the manner in which the inventory items 40 are stowed in the containers 60 may be determined in accordance one or more storage parameters. Storage parameters include, for example, physical characteristics of the inventory items 40, product details of the inventory items 40, expected shipment times for the inventory items 40, types of the inventory items 40, and any other suitable parameter.

Figure 8:
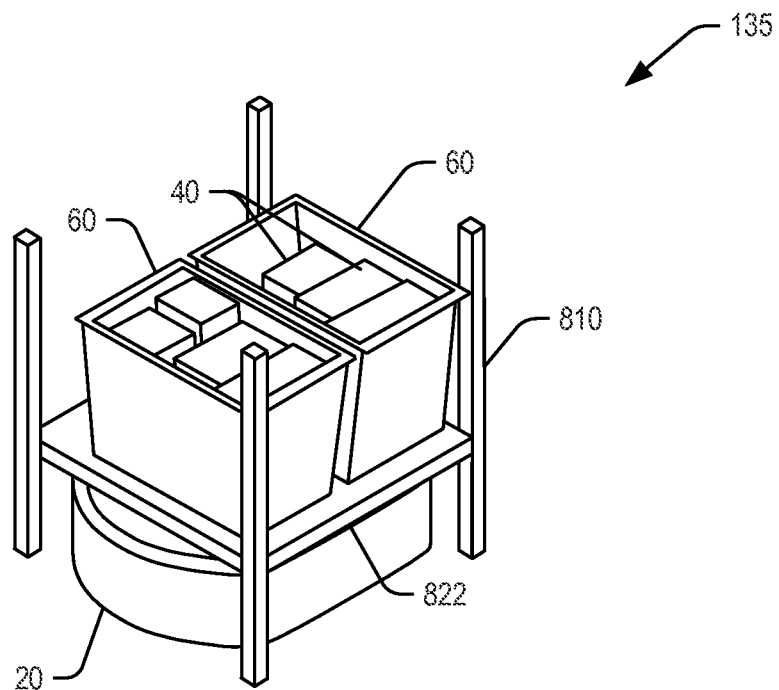
FIGS. 8 and 9 illustrate in greater detail an example container shuttle that may be utilized in particular embodiments of the inventory system as described herein, in accordance with at least one embodiment.
Figure 9:
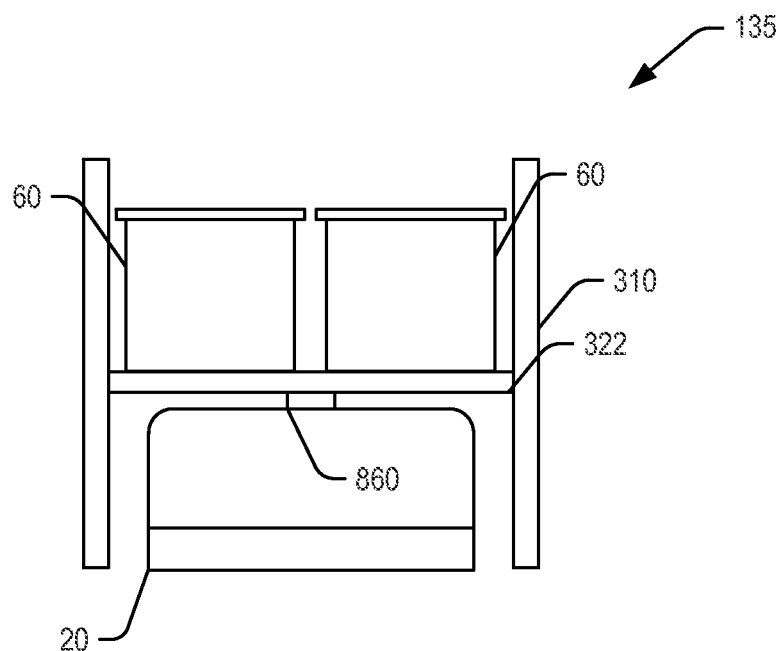

FIGS. 8 and 9 illustrate in greater detail the components of a particular example of the container shuttle 135. In particular, FIG. 8 illustrates a perspective view of the container shuttle 135 and FIG. 9 illustrates a side view of the container shuttle 135. The container shuttle 135 has many characteristics that are similar to the container holder 30 discussed herein. For example, the container shuttle 135 may be configured similarly to the container holder 30 such that the container shuttle 135 can detachably couple with the mobile drive unit 20. To this end, the container shuttle 135 may include holder identifier 860. The container shuttle 135 may be configured to removably receive one or more containers 60. Thus, the containers 60 may be compatible with both the container shuttles 135 and the container holders 30. In this manner, the containers 60 may be easily transferred between the container shuttles 135, the container holders 30, temporary storage locations, and other locations within the workspace 70.

In some examples, the container shuttle 135 may include a shelf 822. In some examples, the container shuttle 135 may include more than one shelf 822. In this manner, the container shuttle 135 may be configured to receive a greater number of the containers 60 than is illustrated in FIGS. 8 and 9. In some examples, the container shuttle 135 may have less capacity for holding the containers 60 than the container holder 30. This may be because the container shuttle 135 is configured to hold inventory for a shorter period of time compared to the container holder 30. For example, the container shuttle 135 may indeed be used to "shuttle" the containers 60 between locations in the workspace 70. At the same time, the container holders 30 may function practically as "inventory shelves" to stow the inventory items 40 in the workspace 70. In some examples, the container holders 30 stow the inventory items 40 until the inventory items 40 are needed elsewhere (e.g., as part of an order, to be counted, to be removed to another storage location, or for any other suitable reason). The container shuttles 135 may be configured to receive the containers 60 that include different types of inventory items 40. For example, the container shuttle 135 may removably receive a first container 60 which holds outbound inventory items and a second container 60 which holds inbound inventory items. In some examples, the containers 60 themselves may include different types of inventory items 40.

In some examples, the container shuttle 135 may be optimized for picking the inventory items 40 from within the containers 60. To this end, the container shuttle 135 may be designed in a manner that enables easy presentment of open top portions of the containers 60 to a human operator or an automated operator. For example, the shelf 822 may be arranged on the container holder 135 at an angle such that the contents of the containers 60 may be more easily accessible to operators. In some examples, there may be a second or third shelf above the shelf 822. Each of these other shelves and the shelf 822 may be arranged at the same or different angles. In some examples, the angle is such that the open tops of the containers 60 are about perpendicular with the surface on which the mobile drive unit 20 moves. In other words, the containers 60 may be held in an orientation that is rotated about 90 degrees from their current orientation. In this example, the container holder 135 may include additional structure to ensure that the containers 60 (and their contents) do not fall from the container shuttle 135.

Figure 10:
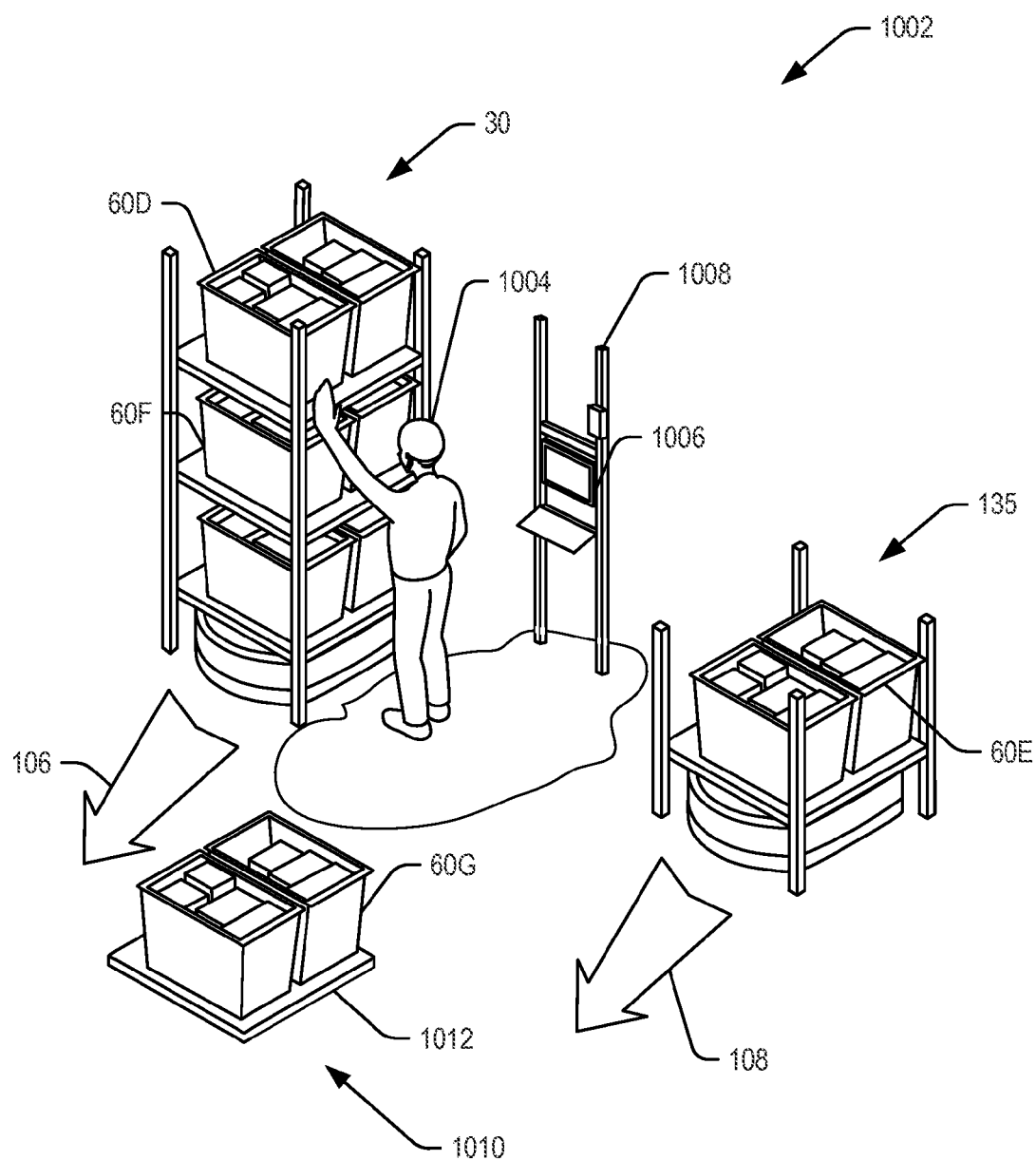
FIG. 10 illustrates a container exchange station that may be utilized in particular embodiments of the inventory system as described herein, in accordance with at least one embodiment.

FIG. 10 illustrates an example container exchange station 1002. The container exchange station 1002 is an example of the container exchange station 102 discussed herein. The container exchange station 1002 may include the container holder 30 in the inventory queue 106. The container holder 30 may include container 60D. The container exchange station 1002 may also include the container shuttle 135 in the shuttle queue 108. The container shuttle 135 may include container 60E. The inventory queue 106 may represent an area in the container exchange station 1002 where the container holders 30 congregate before, during, and/or after the containers 60 are exchanged. Similarly, the shuttle queue 108 may represent an area in the container exchange station 1002 where the container shuttles 135 congregate before, during, and/or after the containers 60 are exchanged. In some examples, the inventory queue 106 and the shuttle queue 108 may include markings (e.g., fiducial or otherwise) to direct the mobile drive units 20 to and from the container exchange station 1002.

An operator 1004 is shown at the container exchange station 1002 in the exchange area 104. The exchange area 104 may generally be described as the area in which the operator 1004 exchanges the containers 60. The operator 1004, in this example, is a human operator. In some examples, the operator 1004 may be automated or semi-automated. This may include, for example, an automated robotic arm configured to identify the containers 60, remove the containers 60 from a first location, and place the containers 60 at a second location. In some examples, the operator 1004 operates a semi-automated device to exchange the containers 60.

The container exchange station 1002 may also include a user device 1006 attached to a mounting structure 1008. In some examples, the user device 1006 may be in network communication with the management module 15. The management module 15 may therefore be configured to communicate instructions regarding exchange of the containers 60 via the user device 1006. For example, the management module 15 may provide human-readable instructions to the user device 1006. The operator 1004 may access the human-readable instructions and act in accordance with the instructions. In some examples, the management module 15 may provide machine-readable instructions to the operator 1004 via the user device 1006 or otherwise. For example, when the operator 1004 is a type of automated operator, the machine-readable instructions may be provided directly to the operator 1004. The operator 1004 may then perform one or more operations in accordance with the instructions. In some examples, the user device 1006 is a handheld device such as, for example, a mobile device, a tablet computer, an inventory management device, or any other suitable user device. In some examples, the user device 1006 includes a memory for storing instructions and a processor for executing the instructions. In some examples, the user device 1006 includes one or more input devices and one or more output devices. For example, the user device 1006 may include a keyboard, mouse, radio-frequency scanner, and/or optical scanner. The user device 1006 may also include a display device and/or speakers for outputting information.

As indicated above, the instructions received from the management module 15 may be machine-readable, human-readable, and in any other suitable format. An example instruction may indicate which of the containers 60 from which of the container holders 30 and/or which of the containers 60 from which of the container shuttles 135 should be removed. For example, a first instruction may indicate that the container 60D be removed from the container holder 30 and placed on the container shuttle 135. In some examples, a second instruction may indicate that the container 60E be removed from the container shuttle 135 and placed on the container holder 30 (perhaps, but not required, in the location where the container 60D was previously located). In some examples, the first instruction and the second instruction are included as a single instruction. In some examples, other instructions (or the single instruction) may indicate that others of the containers 60 be exchanged between the container holder 30, the container shuttle 135, and a temporary storage area 1010. For example, a third instruction may indicate that the container 60F be removed from the container holder 30 and placed in the temporary storage area 1010 or on another of the container holders 30 or on another of the container shuttles 135. The temporary storage area 1010 may include the containers 60 that are being held at the container exchange station 1002 for some short period of time. For example, if the operator 1004 determines, or is instructed, that container 60D requires additional attention for some reason (e.g., inventory items held within the container 60D are broken, spoiled, expired, spilled, or other reason), rather than exchange the container 60D with the container 60E, the operator 1004 may place the container 60D on pallet 1012 at the temporary storage area 1010. In some examples, instead of the pallet 1012, the temporary storage area 1010 may include another container holder 30 or another container shuttle 135. In any event, the containers 60 held in the temporary storage area 1010 may be moved to another location where the additional attention can be provided.

In some examples, the containers 60 from the temporary storage area 1010 may be exchanged with one or more containers 60 from either the container holder 30 and/or the container shuttle 135. For example, an instruction may indicate that the operator 1004 remove the container 60F from the container holder 30 and place the container 60F on the pallet 1012. A second instruction may indicate that the operator 1004 remove the container 60G from the pallet 1012 and place the container 60G on the container holder 30. Variations of exchanging the containers 60 between different holders, different shuttles and different locations, other than those illustrated, are possible using the techniques described herein.

Figure 11:
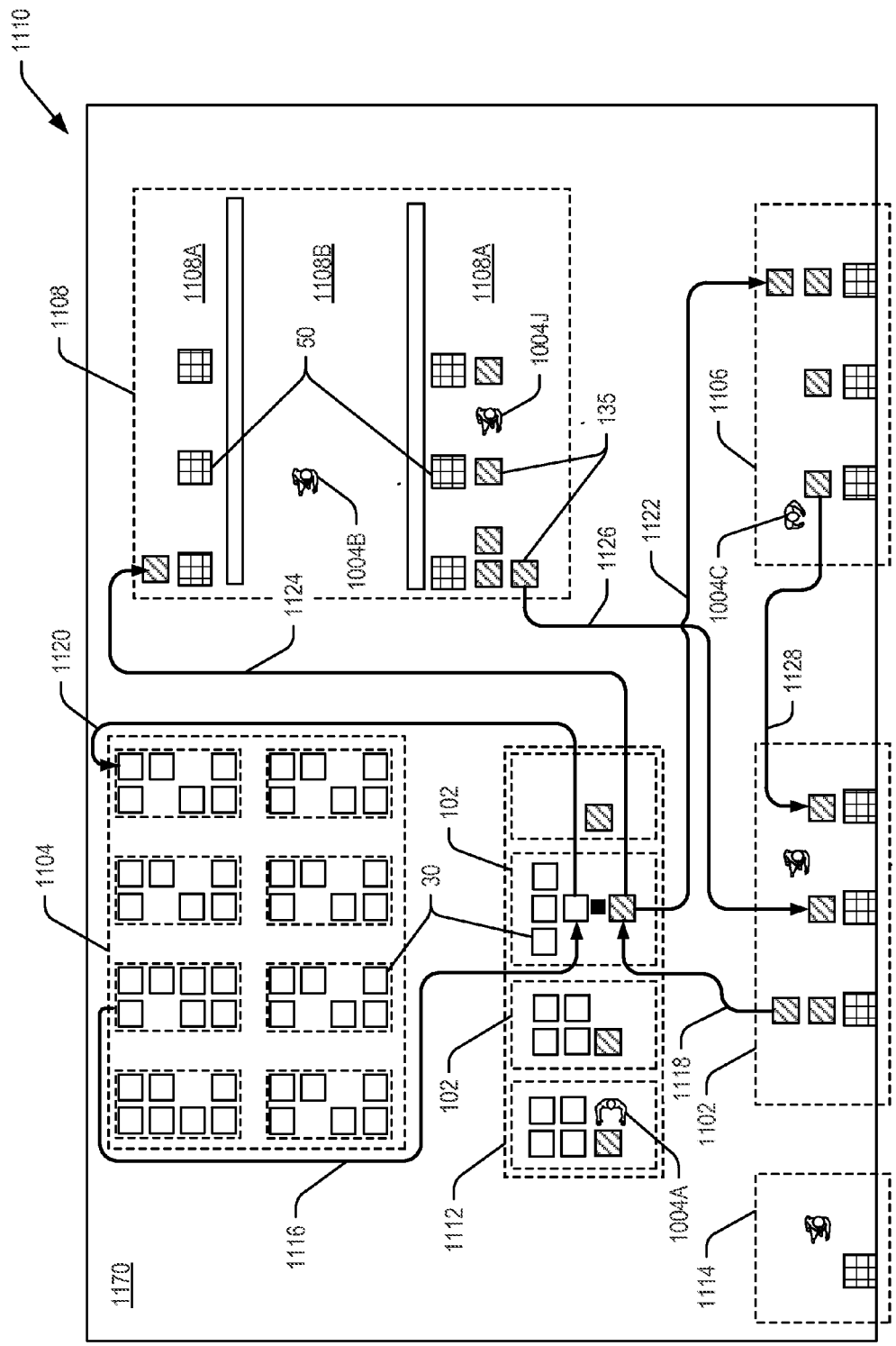
FIG. 11 illustrates components of an inventory system including a container exchange station, in accordance with at least one embodiment.

FIG. 11 illustrates an inventory system 1110 within a workspace 1170. The inventory system 1110 may include a plurality of stations and areas spread throughout the workspace 1170. For example, the inventory system 1110 may include a storage area 1104 (including, among other things, storage, e.g., dense storage, of container holders 30, containers 60 and inventory items 40), a container exchange area 1112 (including, among other things, the container exchange station 102), and inventory processing areas (e.g., a receiving area 1102 (including, among other things, receiving stations), a pick area 1106 (including, among other things, pick stations), a packing area 1108 (including, among other things, packing stations), and a quality control area 1114 (including, among other things, quality control stations)). As described herein, the inventory system 1110 may include one or more container holders 30. In FIG. 11, the container holders 30 are illustrated as squares with no fill. The inventory system 1110 may also include one or more container shuttles 135. In FIG. 11, the container shuttles 135 are illustrated as squares with an angled fill pattern. In FIG. 11, the container holders 30 and the container shuttles 135 are dispersed throughout the workspace 1170, with the container holders 30 generally, though not necessarily, moving among the storage area 1104 and container exchange area 1112, and the container shuttles 135 generally, though not necessarily, moving among all areas of the workspace 1170 other than the storage area 1104. The mobile drive units 20 (not shown) move the container holders 30 and the container shuttles 135 throughout the workspace 1170.

In some examples, the inventory items 40 may be consolidated into the containers 60 within any of the inventory processing areas (e.g., the receiving area 1102, the pick area 1106, the packing area 1108, or the quality control area 1114) or the container exchange area 1112. Consolidation of the inventory items 40 may include removing inventory items 40 from a first container 60 and placing them in a second container 60 to fill up open space in the second container 60. In this manner, the containers 60 that will be exchanged within the container exchange area 1112 may be at full or nearly-full capacity. After being exchanged, these full or nearly-full containers 60 may be held by the container holders 30 within the storage 1104. This may enable continuous, high-density storage of inventory within the containers 60 stored in the container holders 30 in the storage area 1104. Thus, the inventory system 1110 may attempt to maintain inventory in a manner such that substantially all of the container holders 30 include full or nearly-full containers 60 at all times. This may be achieved, at least in part, by utilizing the container exchange area 1112 to transfer the full or nearly-full containers 60 to be moved to the storage area 1104. In some examples, consolidation of the inventory items 40 may be avoided while the containers 60 are located within the storage area 1104. Instead, consolidation may be performed within the inventory processing areas.

The inventory system 1110 may also include one or more inventory stations 50. The inventory stations 50 are distributed throughout the workspace 1170. In FIG. 11, the inventory stations 50 are illustrated as squares with a thatched fill pattern. The actions that take place at each of the particular inventory stations 50 may depend on the area in which the inventory stations 50 are located. For example, at the inventory stations 50 within the container exchange area 1112, the containers 60 may be exchanged. In another example, at the inventory stations 50 within the packing area 1108, the inventory items 40 may be packed and sent to customers. In some examples, at the packing area 1108, the inventory items 40 may be picked from the containers 60 and packed in suitable packaging prior to being shipped. Thus, in some examples, the packing area 1108 may be defined as having one or more picking subareas 1108A, where the inventory items 40 may be picked, and one or more packing subareas 1108B, wherein the inventory items 40 may be packed as described herein. To this end, one or more operators 1004B and 1004J may pick and pack inventory items 40 that will be shipped to customers.

Within the receiving area 1102, the inventory items 40 may be removed from shipping boxes, pallets, crates, totes or any other received shipping containers and loaded into the containers 60 at the inventory stations 50. The container shuttles 135, including the containers 60, may then be moved from the receiving area 1102 to one or more of the other areas described herein. For example, if the inventory items 40 are identified as inbound inventory items, the container shuttle 135 may move the container 60 including the inbound inventory items to the storage area 1104 via the container exchange area 1112. As another example, if the inventory items 40 are identified as outbound inventory items, the container shuttle 135 may move the container 60 including the outbound inventory items to the pick area 1106 or the packing area 1108, where at least some of the inventory items 40 may be picked from the container 60. In some examples, the pick area 1106 may include one or more pick stations. The containers 60 may be presented at the pick stations where operators can pick the inventory items 40. In some examples, within the receiving area 1102 or any other areas of workspace 1170, the inventory items 40 may be removed from the containers 60 for consolidation, for storage, and the like. In some examples, partially full containers 60 are combined within the receiving area 1102. This may include an operator removing one or more inventory items 40 from a first container 60 and placing the one or more inventory items 40 in a second container 60 to create a full container 60.

In some examples, the inventory items 40 received at the receiving area 1102 are within one or more transship containers (not shown) that may be sized and shaped similar to the containers 60. The transship containers may be configured for holding inventory items 40 during transit outside of the workspace 1170. In some examples, the transship containers may be introduced into the inventory system 1110 in a similar manner as the containers 60. For example, a transship container may be loaded on one of the container shuttles 135, moved to the container exchange area 1112, transferred to one of the container holders 30, and stored in the storage area 1104.

Within the container exchange area 1112, the containers 60 may be exchanged in accordance with techniques described herein. In some examples, the container exchange area 1112 may include one or more container exchange stations 102. Within any of the container exchange stations 102, one or more operators 1004A may be situated. The operators 1004A may exchange the containers 60 that are presented at the container exchange stations 102.

Within the storage area 1104 may be located the container holders 30 which hold stowed inventory items. The location of each of the inventory items in the container holders 30 in the storage area 1104 is accessible by the management module 15. Thus, these inventory items are ones which are being stowed and may not yet be associated with a customer order. Thus, the storage area 1104 may include the container holders 30 organized into one or more groupings.

Within the pick area 1106, outbound inventory items may be picked from container shuttles 135, various ones of which may or may not need packaging. Picking a particular inventory item 40 from a particular container 60 may include an operator removing the inventory item 40 from the container 60. In some examples, a list of inventory items to be picked is provided to one or more operators 1004C. From the pick area 1106, the container shuttles 135 may be moved to the packing area 1108, or the inventory items may otherwise provided for shipping to customers. Within the packing area 1108, the inventory items 40 that have been picked are packed by one or more operators 1004B into boxes and shipped to customers. In addition, if certain inventory items 40 need to picked, the operator 1004J may pick those items from the containers 60. Finally, the inventory items 40, the containers 60, the container holders 30, and/or the container shuttles 135 that require quality control may be sent to the quality control area 1114. For example, at the quality control area 1114, the contents (e.g., the inventory items 40) of a particular container 60 may be removed and counted. In some examples, the particular container 60 may be moved to the inventory station 50 in the quality control area 1114 by the mobile drive unit 20 coupled to a particular container shuttle 135. In this manner, the container shuttles 135 may be moved between many different areas of the workspace 1170. Within any of the areas of the workspace 1170 may be included any suitable number of operators 1004. Such operators 1004 may be human operators, or automated or semi-automated operators as described herein.

In some examples, the workspace 1170 may be disposed among one or more floors of a facility. For example, the storage area 1104 may be located on a first floor, while the remaining areas (e.g., 1102, 1106, 1108, 1112, and 1114) may be located on a second floor. In some examples, a portion of one or more areas may disposed on one or more floors of a facility. For example, the container exchange area 1112 may be disposed among two floors. On a first floor may be disposed a queue of the container holders 30. On a second floor may be located a second queue of the container shuttles 135. In this manner, the container exchange stations 102 may not only exchange the containers 60 between the container holders 30 and the container shuttles 135, but may also exchange the containers 60 between one or more floors.

In FIG. 11 is illustrated example movement paths 1116, 1118, 1120, 1122, 1124, 1126, and 1128. In this example, at 1116, the container holder 30 is moved from the storage area 1104 to the container exchange station 102 within the container exchange area 1112. In some examples, the container holder 30 in this example lines up in an inventory queue (not shown). The container holder 30 in this example may include one or more containers 60 including an outbound inventory item. At 1118, the container shuttle 135 is moved from the receiving area 1102 to the container exchange station 102 within the container exchange area 1112. The container shuttle 135 in this example lines up in a shuttle queue (not shown). The container shuttle 135 in this example may include one or more containers 60 including an inbound inventory item. While the container holder 30 and the container shuttle 135 are located at the container exchange station 102, at least some of the containers 60 are exchanged between the container holder 30 and the container shuttle 135. For example, the container 60 including an outbound inventory item from the container holder 30 may be placed on the container shuttle 135, and the container 60 including an inbound inventory item from the container shuttle 135 may be placed on the container holder 30.

Next, at 1120, the container holder 30 is moved from the container exchange area 1112 to the storage area 1104. In this manner, the container holder 30 may continue to store inventory within the containers 60 that were added to the container holder and within the containers 60 that were already on the container holder 30. Next, at 1122, the container shuttle 135 is moved from the container exchange area 1112 to the pick area 1106 where the outbound inventory items 40 within at least the exchanged containers 60 are picked. In some examples, at 1124, the container shuttle 135 is moved from the container exchange area 1112 to the packing area 1108 where the outbound inventory items 40 within at least the exchanged containers 60 are picked, packed, and/or picked and packed. In some examples, at 1126, the same container shuttle 135 that was moved from the packing area 1108 or a different container shuttle 135 is moved from the packing area 1108 to the receiving area 1102. The movement path 1126 may represent the movement path of a particular container 60 from which some outbound inventory items were picked and shipped, but which also still includes stowed inventory items 40. Instead of going back to the storage area 1104 partially full, this container 60 can be moved to the receiving area 1102 to receive other inventory items 40. From the receiving area 1102, the container 60 on the container shuttle 135 can be moved along the movement path 1118 to the container exchange area 1112. Similarly, in some examples, at 1128, the same container shuttle 135 that was moved from the pick area 1106 or a different container shuttle 135 is moved from the pick area 1106 to the receiving area 1102. The movement path 1128 may represent the movement path of a container 60 from which some outbound inventory items were picked, but which also still includes stowed inventory items 40. Instead of going back to the storage area 1104 partially full, this container 60 can be moved to the receiving area 1102 to receive other inventory items 40. From the receiving area 1102, the container 60 on the container shuttle 135 can be moved along the movement path 1118 to the container exchange area 1102.

Figure 12:
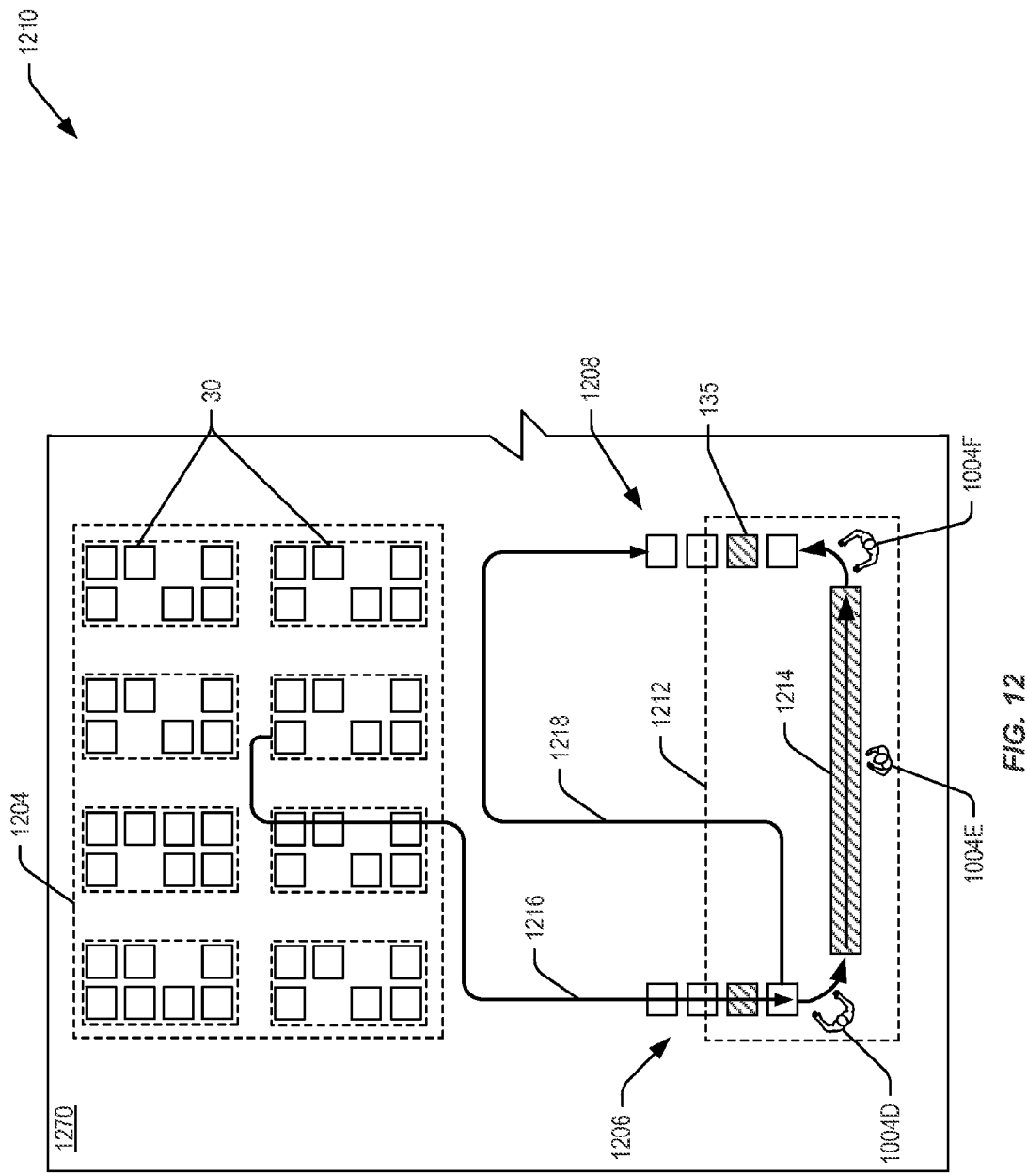
FIG. 12 illustrates components of an inventory system including a container exchange station, in accordance with at least one embodiment.

FIG. 12 illustrates an inventory system 1210 within a workspace 1270. The inventory system 1210 may be configured similar to the inventory system 1110. In some examples, the inventory system 1210 may be configured to attempt to maintain inventory in a manner such that substantially all of the container holders 30 include full or nearly-full containers 60 at all times. This may be achieved, at least in part, by utilizing container exchange area 1212 to transfer the full or nearly-full containers 60 to be moved to storage area 1204. In some examples, the inventory items 40 may be consolidated into the containers 60 within any of the inventory processing areas described herein. Consolidation of the inventory items 40 may include removal of inventory items 40 from a first container 60 and placement of the inventory items 40 in a second container 60 to fill up open space in the second container 60. In this manner, the containers 60 that will be exchanged within the container exchange area 1212 may be at full or nearly-full capacity. After being exchanged, these full or nearly-full containers 60 may be held by the container holders 30 within the storage 1204. This may enable continuous, high-density storage of inventory within the containers 60 stored in the container holders 30 in the storage area 1204.

In this example, a container exchange area 1212 may be configured differently than the container exchange area 1112 described herein. In this example, the container exchange area 1212 may include a first queue 1206 and a second queue 1208. Each of the queues 1206, 1208 may include the container holders 30 and the container shuttles 135. In some examples, each of the queues 1206, 1208 is dedicated to one of the container shuttles 135 or the container holders 30. However, the scope of this disclosure is not so limited. In any event, container exchange area 1212 may also include an inventory conveyance system 1214. The inventory conveyance system 1214 may be configured to convey one or more containers 60 from a first location to a second location (e.g., from the first queue 1206 to the second queue 1208). In some examples, the inventory conveyance system 1214 may include one or more conveyor belts coupled to one or more drive units. In some examples, the inventory conveyance system 1214 conveys the containers 60 using gravity. For example, the first queue 1206 may be located on a second floor of the workspace 1270 and the second queue 1208 may be located on a first floor of the workspace 1270 and the inventory conveyance system 1214 may include an elevator to move the containers 60 between the floors. The container exchange area 1212 may also include one or more operators 1004. The operators 1004 may be configured to remove the containers 60 from the container holders 30 and/or the container shuttles 135, place the containers 60 on the inventory conveyance system 1214, remove the containers 60 from the inventory conveyance system 1214, and place the containers on the container holders 30 and/or the container shuttles 135.

In some examples, the container shuttles 135 in the first queue 1206 may include the containers 60 that include the inbound inventory items 40. The container shuttles 135 in the second queue 1208 may receive the containers 60 that include the outbound inventory items 40. The first queue 1206 may also include the container shuttles 135 that include the containers 60 holding the inventory items 40 identified for some other inventory processing purpose (e.g., counting, consolidation, etc.) at the container exchange area 1212. In some examples, the container holders 30 in the first queue 1206 may include the outbound inventory items 40, while the container holders 30 in the second queue 1208 may receive the containers 60 holding the inbound inventory items 60 that can be moved to the storage area 1204 to enable high density storage. In some examples, the operator 1004D may be configured to remove the containers 60 including the outbound inventory items 40 from the container holders 30 and place the containers 60 on the inventory conveyance system 1214. Meanwhile, the operator 1004F may be configured to remove the containers 60 from the inventory conveyance system 1214 and place the containers 60 including the outbound inventory items 40 on the container shuttles 135. In some examples, the operator 1004D may be configured to remove the containers 60 including the inbound inventory items 40 from the container shuttles 135 and place the containers 60 on the inventory conveyance system 1214. Meanwhile, the operator 1004F may be configured to remove the containers 60 including the inbound inventory items 40 from the inventory conveyance system 1214 and place the containers 60 on the container holders 30 to maintain high density storage within the storage area 1204. In some examples, the operator 1004D may be configured to remove the containers 60 including inventory items 40 for processing at the container exchange area 1212 from the container holders 30 and place the containers 60 on the inventory conveyance system 1214. Meanwhile, the operator 1004F may be configured to remove the containers 60 including inventory items 40 after processing at the container exchange area 1212 from the inventory conveyance system 1214 and place the containers 60 on other container holders 30 to maintain high density storage within the storage area 1204. In this manner, the containers 60 may be consolidated, counted or otherwise processed, for example, by operator 1004E, as described below. In some examples, the operator 1004E may remove the containers 60 from the inventory conveyance system 1214 and place the containers 60 in a temporary storage area. In some examples, the operator 1004E may remove the containers 60 from the temporary storage area and place the containers 60 on the inventory conveyance system 1214. Later, the operator 1004F may remove these containers 60 placed by the operator 1004E and place these containers 60 on the container holders 30 to maintain high-density storage.

In FIG. 12 is illustrated example movement paths 1216 and 1218. In this example, at 1216, the container holder 30 is moved from the storage area 1204 to the first queue 1206 of the container exchange area 1212. The operator 1004D selects a particular container 60 from the container holder 30 and places the particular container 60 on the inventory conveyance system 1214. As the particular container 60 moves along the inventory conveyance system 1214, operator 1004E may perform one or more operations with respect to the particular container 60. For example, the operator 1004E may perform one or more consolidation techniques with respect to the inventory items 40 within the particular container 60. Consolidation may include removing or adding inventory items 40 to the particular container 60, consolidating inventory items 40 in other containers 60 to be placed back on the container holders 30 (e.g., by the operator 1004F) to be moved to the storage area 1204, removing inventory items 40 from the particular container 60 that are intended for other inventory processing areas (e.g., picking, packing, counting, quality control, etc.) and consolidating those inventory items 40 in other containers 60 to be placed on the container shuttles 135 to be moved to the inventory processing areas. In some examples, because the particular container 60 is moving along the inventory conveyance system 1214, the operator 1004E may have time to perform any of the operations discussed above prior to the operator 1004F needing to remove the particular container 60. In this manner, the inventory conveyance system 1214 may enable interim operations to be performed during the container exchange. Next, the particular container 60 is removed from the inventory conveyance system 1214 by the operator 1004F and placed on a different container holder 30 to be returned back to the storage area 1204 or on one of the container shuttles 135 to be moved to a different area of the workspace 1270. At 1218, the container holder 30 from which the particular container 60 was removed is moved to the second queue 1208. Later, the container holder 30 in the second queue 1208 will receive another container 60 to be stowed in the storage area 1204.

Figure 13:
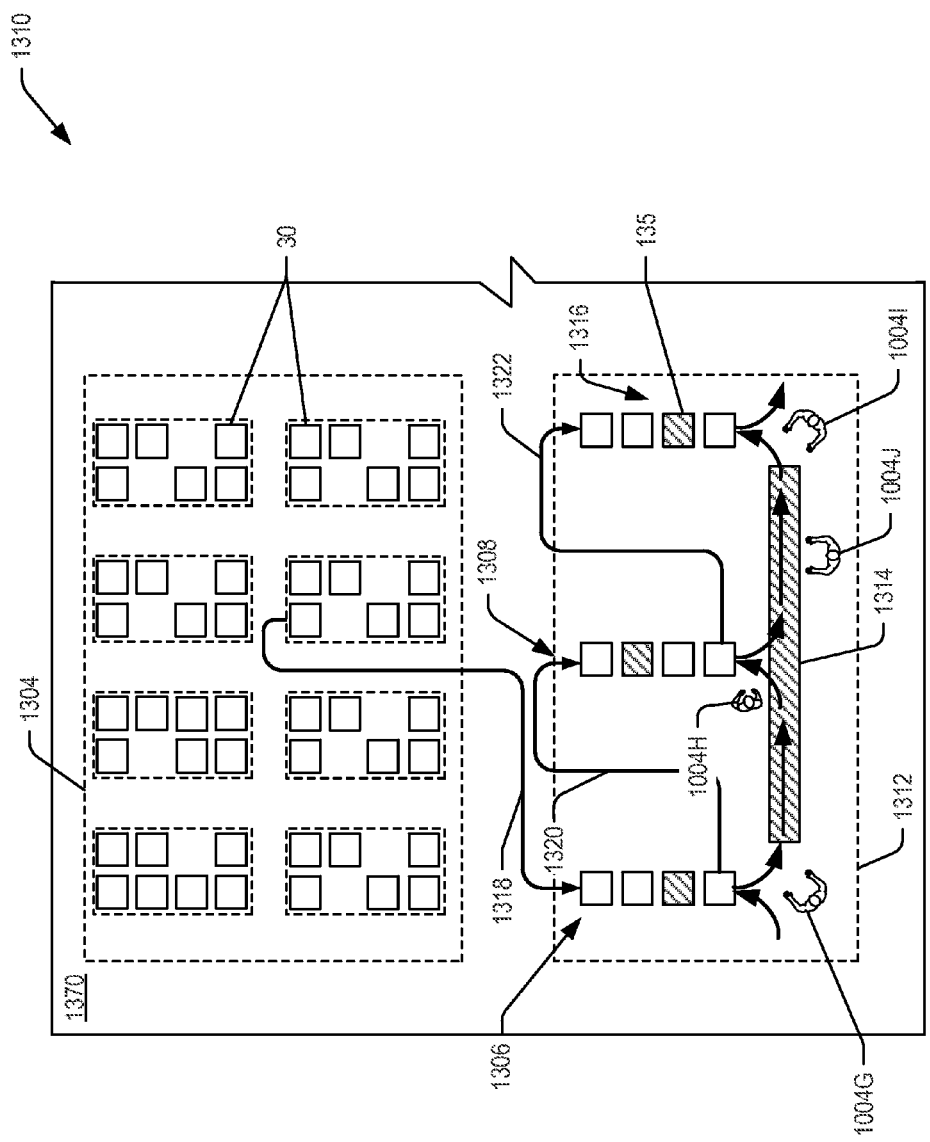
FIG. 13 illustrates components of an inventory system including a container exchange station, in accordance with at least one embodiment.

FIG. 13 illustrates an inventory system 1310 within a workspace 1370. The inventory system 1310 may be configured similar to the inventory systems 1110, 1210. However, in this example, a container exchange area 1312 may be configured differently. In this example, the container exchange area 1312 may include a first queue 1306, a second queue 1308, and a third queue 1316. Each of the queues 1306, 1308, and 1316 may include the container holders 30 and the container shuttles 135. In some examples, each of the queues 1306, 1308, and 1316 is dedicated to one of the container shuttles 135 or the container holders 30. However, the scope of this disclosure is not so limited. In any event, a container exchange area 1312 may also include an inventory conveyance system 1314. The inventory conveyance system 1314 is an example of the inventory conveyance system 1214 described herein.

Within the first queue 1306 may be lined up those container holders 30 and those container shuttles 135 that have containers 60 to be removed. For example, at movement path 1318, the container holder 30 is moved from the storage area 1304 to the first queue 1306 of the container exchange area 1312. The operator 1004G removes a particular container 60 from the container holder 30 and places it on the inventory conveyance system 1314. Within the second queue 1308 may be lined up those container holders 30 and/or those container shuttles 135 that have containers 60 to be removed and/or those container holders 30 and/or those container shuttles 135 that are able to accept the containers 60. For example, a first container 60 may be removed from the container holder 30 in the first queue 1306 and the first container 60 may be placed on the container shuttle 135 in the second queue 1308. Similarly, a second container 60 may be removed from the container shuttle 135 in the second queue 1308 by the operator 1004H and placed on the inventory conveyance system 1314. Next, the second container 60 may be removed from the inventory conveyance system 1314 by an operator 1004I and placed on one of the container holders 30 or the container shuttles 135 within the third queue 1316.

In some examples, the container shuttles 135 in the first queue 1306 or the second queue 1308 may include the containers 60 that include the inbound inventory items 40. The container shuttles 135 in the second queue 1308 and/or the third queue 1316 may receive the containers that include the outbound inventory items 40. The first queue 1306 or the second queue 1308 may also include the container shuttles 135 that include the containers 60 holding the inventory items 40 identified for some other inventory processing purpose (e.g., counting, consolidation, etc.) at the container exchange area 1312. In some examples, the container holders 30 in the first queue 1306 and/or the second queue 1308 may include the outbound inventory items 40, while the container holders 30 in the second queue 1308 and/or the third queue 1316 may receive the containers 60 holding the inbound inventory items 60 that can be moved to the storage area 1304 to enable high density storage. In some examples, the operators 1004G and 1004H may be configured to remove the containers 60 including inbound or outbound inventory items 40 or inventory items 40 for processing at the container exchange area 1312 from the container holders 30 and/or the container shuttles 135 and place the containers 60 on the inventory conveyance system 1314. Meanwhile, the operators 1004H and 1004I may be configured to remove the containers 60 including inbound or outbound inventory items 40 or inventory items 40 after processing at the container exchange area 1312 from the inventory conveyance system 1314 and place the containers 60 on the container shuttles 135 and/or the container holders 30. In some examples, the operators 1004G and 1004H may be configured to remove the containers 60 including inbound inventory items 40 from the container shuttles 135 and place the containers 60 on the inventory conveyance system 1314. Meanwhile, the operators 1004H and 1004I may be configured to remove the containers 60 including inbound inventory items 40 from the inventory conveyance system 1314 and place the containers 60 on the container holders 30 to maintain high density storage within the storage area 1304. In this manner, the containers 60 may be consolidated, counted or otherwise processed, for example, by operator 1004J, as described below.

In some examples, as a particular container 60 moves along the inventory conveyance system 1314, operator 1004J may perform one or more operations with respect to the particular container 60. For example, the operator 1004J may perform one or more consolidation techniques with respect to the inventory items 40 within the particular container 60. Consolidation may include removing or adding inventory items 40 to the particular container 60, consolidating inventory items 40 in other containers 60 to be placed back on the container holders 30 (e.g., by the operator 1004H or 1004I) to be moved to the storage area 1304, removing inventory items 40 from the particular container 60 that are intended for other inventory processing areas (e.g., picking, packing, counting, quality control, etc.) and consolidating those inventory items 40 in other containers 60 to be placed on the container shuttles 135 to be moved to the inventory processing areas. In some examples, because the particular container 60 is moving along the inventory conveyance system 1314, the operator 1004J may have time to perform any of the operations discussed above prior to one of the operators 1004H or 1004I needing to remove the particular container 60. In this manner, the inventory conveyance system 1314 may enable interim operations to be performed during the container exchange.

In some examples, the operator 1004J may remove the containers 60 from the inventory conveyance system 1314 and place the containers 60 in a temporary storage area. In some examples, the operator 1004J may remove the containers 60 from the temporary storage area and place the containers 60 on the inventory conveyance system 1314. Later, one of the operators 1004H or 1004I may remove these containers 60 placed by the operator 1004J and place these containers 60 on the container holders 30 to maintain high-density storage or on the container shuttles 135 to be moved to an inventory processing area.

According to movement paths 1320 and 1322, after the container holders 30 and/or the container shuttles 135 receive or drop off the containers 60, the container holders 30 and/or the container shuttles 135 may move to the next queue to the right. Because there is no queue to the left of the first queue 1306, in the first queue 1306, the containers 60 may only be removed from the container holders 30 and the container shuttles 135. In some examples, in the first queue 1306, the containers 60 are taken from a temporary storage location (not shown) and placed on the inventory conveyance system 1314 or on one of the container holders 30 or the container shuttles 135. In the second queue 1308, the containers 60 may be removed from the container holders 30 and the container shuttles 135 and/or placed on the same. In the third queue 1316, the containers 60 may be placed on the container holders 30 and the container shuttles 135. In some examples, the operator 1004J may remove containers 60 from the container holders 30 and the container shuttles 135 and place them in a temporary storage area (not shown). In some examples, an operator 1004J may assist in the exchange of the containers 60.

In some examples, the inventory system 1310 may be configured to attempt to maintain inventory in a manner such that substantially all of the container holders 30 include full or nearly-full containers 60 at all times. This may be achieved, at least in part, by utilizing container exchange area 1312 to transfer the full or nearly-full containers 60 to be moved to the storage area 1304. In some examples, the inventory items 40 may be consolidated into the containers 60 within any of the inventory processing areas described herein. Consolidation of the inventory items 40 may include removal of inventory items 40 from a first container 60 and placement of the inventory items 40 in a second container 60 to fill up open space in the second container 60. In this manner, the containers 60 that will be exchanged within the container exchange area 1312 may be at full or nearly-full capacity. After being exchanged, these full or nearly-full containers 60 may be held by the container holders 30 within the storage 1304. This may enable continuous, high-density storage of inventory within the containers 60 stored in the container holders 30 in the storage area 1304.

Figure 14:
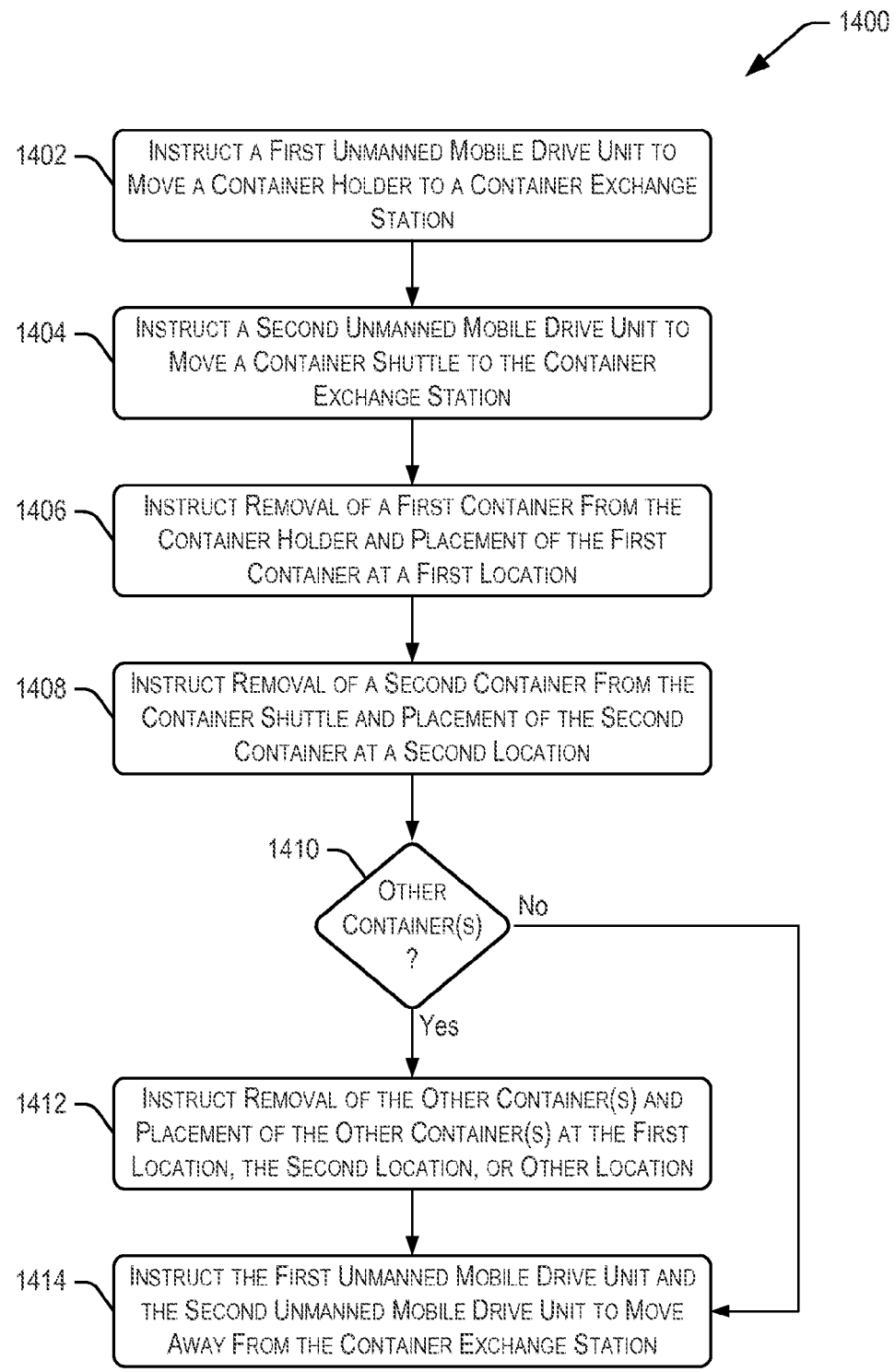
FIG. 14 illustrates a flow diagram depicting example acts for implementing techniques relating to managing movement of containers including inventory items as described herein, in accordance with at least one embodiment.
Figure 15:
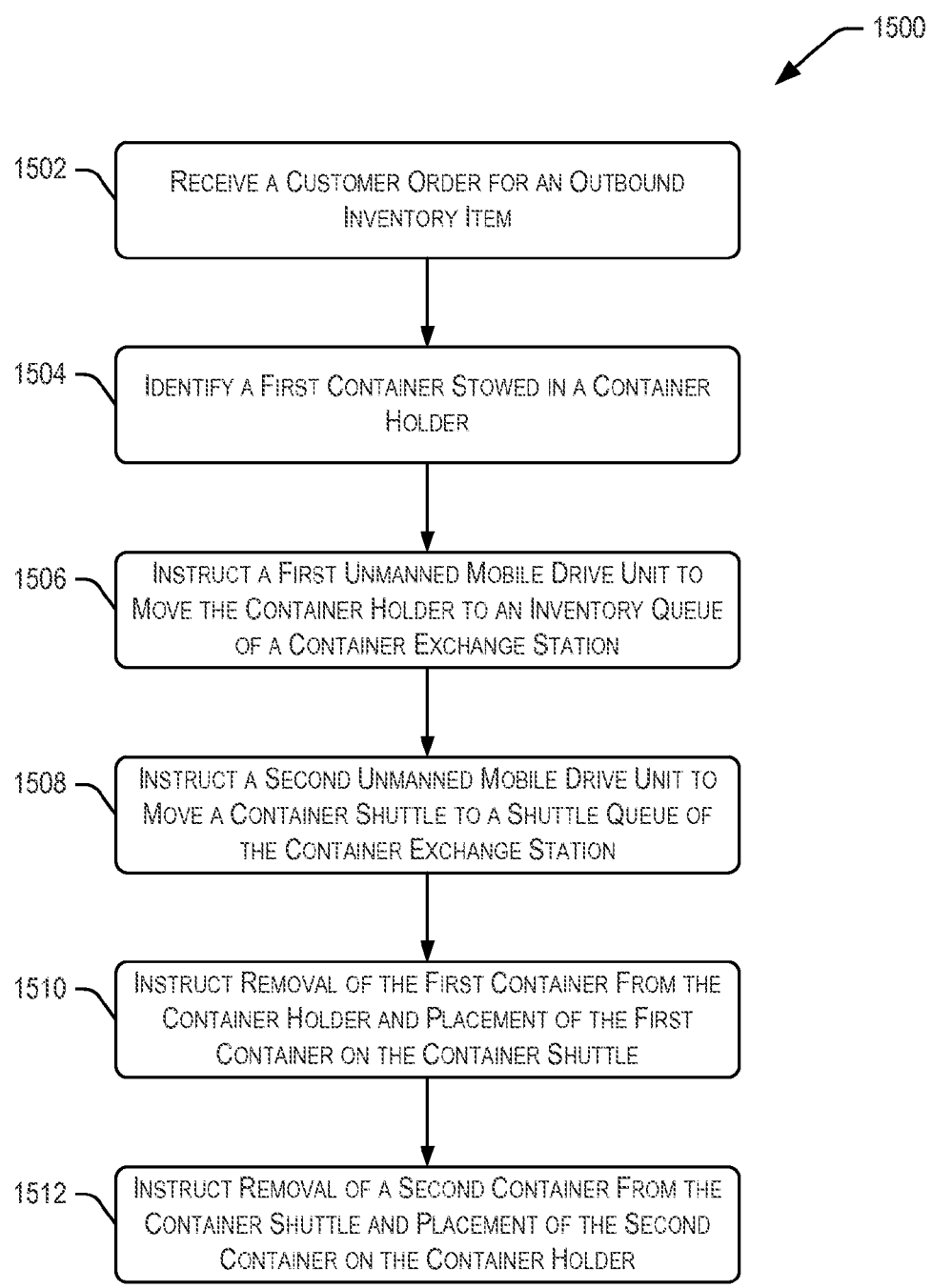
FIG. 15 illustrates a flow diagram depicting example acts for implementing techniques relating to managing movement of containers including inventory items as described herein, in accordance with at least one embodiment.

FIGS. 14 and 15 illustrate example flow diagrams showing respective processes 1400 and 1500, as described herein. These processes 1400 and 1500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 14 depicts the process 1400 including example acts and/or procedures relating to managing movement of containers including inventory items in accordance with at least one example. The management module 15 (FIG. 3) may perform the process 1400 of FIG. 14. The process 1400 begins at 1402 by instructing a first unmanned mobile drive unit to move a container holder to a container exchange station. In some examples, instructing the first unmanned mobile drive unit may be performed by the route planning module 94 (FIG. 3). Instructing the first unmanned mobile drive unit may include instructing to first unmanned mobile drive unit to navigate to storage area of a workspace, identify the container holder within the workspace, identify a particular container on the container holder, detachably couple to the container holder, and/or move the container holder to the container exchange station. In some examples, the container exchange station is located on a first floor of the workspace and the storage area is located on a second floor of the workspace. In this example, moving the container holder may include passing the container holder between the two floors or instructing the first unmanned mobile drive unit coupled to the container holder to move between the two floors.

At 1404, the process 1400 instructs a second unmanned mobile drive unit to move a container shuttle to the container exchange station. In some examples, instructing the second unmanned mobile drive unit may be performed by the route planning module 94. Instructing the second unmanned mobile drive unit may include instructing the second unmanned mobile drive unit to navigate to a receiving area, a pick area, a quality control area, or any other suitable area of a workspace, identify the container shuttle within the workspace, identify a particular container on the container shuttle, detachably couple to the container shuttle, and/or move the container shuttle to the container exchange station. In some examples, the container exchange station is located on a first floor of the workspace and one of the other areas is located on a second floor of the workspace. In this example, moving the container shuttle may include passing the container shuttle between the two floors or instructing the second unmanned mobile drive unit coupled to the container shuttle to move between the two floors.

At 1406, the process 1400 instructs removal of a first container from the container holder and placement of the first container at a first location. In some examples, instructing removal of the first container and placement of the first container may be performed by the inventory module 97 (FIG. 3). Instructing may include generating and providing instructions. The instructions may include human-readable instructions and/or machine-readable instructions. In some examples, a portion of the human-readable instructions is provided to a user device associated with the container exchange station. The physical removal and placement of the first container may be performed by a human operator in accordance with the portion of the human-readable instructions. In some examples, a portion of the machine-readable instructions are provided to an automated operator and the automated operator removes and places the first container. In some examples, the removal and placement of the first container may be performed by one or more human operators, one or more automated operators, a human operating a semi-automated operator, and any suitable combination of the foregoing. In some examples, the instructions may uniquely identify the first container. In some examples, the instructions may generically identify the first container. For example, the instructions may indicate that at least one of a plurality of containers held by the container holder be removed and placed at the first location. In some examples, the instructions may identify a particular shelf of the container holder from which the first container may be removed. In some examples, the first location is a shelf of the container shuttle. In some examples, the first location is a temporary storage location associated with the container exchange station. The first location may also be located on a second container holder. Thus, in some examples, containers may be exchanged between two or more container holders.

At 1408, the process 1400 instructs removal of a second container from the container shuttle and placement of the second container at a second location. In some examples, instructing removal of the second container and placement of the second container may be performed by the inventory module 97. Instructing may include generating and providing instructions. The instructions may include human-readable instructions and/or machine-readable instructions. In some examples, a portion of the human-readable instructions is provided to a user device associated with the container exchange station. The physical removal and placement of the second container may be performed by a human operator in accordance with the portion of the human-readable instructions. In some examples, a portion of the machine-readable instructions are provided to an automated operator and the automated operator removes and places the second container. In some examples, the removal and placement of the second container may be performed by one or more human operators, one or more automated operators, a human operating a semi-automated operator, and any suitable combination of the foregoing. In some examples, the instructions may uniquely identify the second container. In some examples, the instructions may generically identify the second container. For example, the instructions may indicate that at least one of a plurality of containers held by the container shuttle be removed and placed at the second location. In some examples, the instructions may identify a particular shelf of the container shuttle from which the second container may be removed. In some examples, the second location is a shelf of the container holder. In some examples, the second location is a temporary storage location associated with the container exchange station. The second location may also be located on a second container shuttle. Thus, in some examples, containers may be exchanged between two or more container shuttles.

At 1410, the process 1400 determines whether there are other containers to be removed, placed or exchanged. In some examples, determining whether there are other containers may be performed by the inventory module 97. In some examples, this may include determining whether there are other containers to be removed from the container holder and/or the container shuttle. In some examples, determining whether there are other containers may include determining whether there are other containers to be added to the container holder and/or the container shuttle. In some examples, the first container and second container are directly exchanged for each other (e.g., a one-to-one exchange). In some examples, the exchange of containers between the container holder and the container shuttle may be greater than one to one and, in some examples, may be unequally distributed (e.g., one to more than one). Thus, in some examples, the container holder and the container shuttle may remain at the container exchange station until more than the first container and the second container are removed and placed.

If the answer at 1410 is no, the process 1400 continues to 1414. At 1414, the process 1400 instructs the first unmanned mobile drive unit and the second unmanned mobile drive unit to move away from the container exchange station with their respective container holder or container shuttle. In some examples, instructing the first unmanned mobile drive unit and instructing the second unmanned mobile drive unit may be performed by the route planning module 94. Instructing may include providing individual instructions to each of the unmanned mobile drive units. In some examples, the individual instructions may indicate particular areas in the workspace to which the unmanned mobile drive units are to navigate.

If the answer at 1410 is yes, the process 1400 continues to 1412. At 1412, the process 1400 instructs removal of the other containers and placement of the other containers at the first location, the second location, and/or other locations. Instructing removal and placement of the other containers may be performed by the inventory module 97. Block 1412 of process 1400 may be performed in a manner similar to the process 1400 described with reference to blocks 1406 and 1408. In some examples, instructing removal of the other containers and placement of the other containers may be performed by one or more human operators or by an automated operator configured to handle one or more containers. For example, such an automated operator may include one or more robotic arms each configured to handle one or more containers simultaneously.

FIG. 15 depicts the process 1500 including example acts and/or procedures relating to managing movement of containers including inventory items in accordance with at least one example. The management module 15 (FIG. 3) may perform the process 1500 of FIG. 15. The process 1500 begins at 1502 by receiving a customer order for an outbound inventory item. In some examples, receiving the customer order for the outbound inventory item may be performed by the inventory module 97 (FIG. 3). In some examples, before the customer order is received, the outbound inventory item is considered a stored inventory item and is stored in one of a plurality of containers held in one of a plurality of container holders within a storage area of a workspace. The customer order may be provided by an electronic marketplace. In some examples, the customer is a customer of the electronic marketplace and the customer order is for an item that the customer ordered via the electronic marketplace. In some examples, the customer order uniquely identifies a particular outbound inventory item. For example, the customer order may identify a unique item identifier associated with a single collector's edition of a comic book. An operator may receive an instruction including the unique item identifier identifying the single collector's edition of the comic book. In some examples, the customer order generically identifies a particular outbound inventory item. For example, the customer order may identify an item identifier associated with two or more copies of the same comic book. An operator may receive an instruction including the item identifier which would allow the operator to pick any of the two or more copies of the comic book which have the item identifier.

At 1504, the process 1500 identifies a first container stowed in a container holder. In some examples, identifying the first container may be performed by the inventory module 97. In some examples, the outbound inventory item is located within the first container.

At 1506, the process 1500 instructs a first unmanned mobile drive unit to move the container holder to an inventory queue of a container exchange station. In some examples, instructing the first unmanned mobile drive unit may be performed by the route planning module 94. In some examples, the first unmanned mobile drive unit moves the container holder from the storage area of the workspace. In some examples, the container holder is configured to removably receive one or more containers. In some examples, each of the one or more containers includes one or more inventory items. In some examples, the one or more containers are organized based on characteristics of the inventory items. In some examples, the one or more containers may be full, partially full, or empty. In some examples, the inventory queue of the container exchange station is an area of the container exchange station where container holders are held before, during, or after their containers are exchanged at the container exchange station.

At 1508, the process 1500 instructs a second unmanned mobile drive unit to move a container shuttle to a shuttle queue of the container exchange station. In some examples, instructing the second unmanned mobile drive unit is performed by the route planning module 94. In some examples, the second mobile drive unit moves the container shuttle from an area of the workspace other than the storage area. In some examples, the container shuttle is configured to hold containers for a shorter duration than the container holder. In some examples, the container shuttle is configured to removably receive one or more containers. In some examples, each of the one or more containers includes one or more inventory items. The one or more containers may be organized based on characteristics of the inventory items. In some examples, the one or more containers may be full, partially full, or empty. In some examples, the shuttle queue of the container exchange station is an area of the container exchange station where container shuttles are held before, during, or after their containers are exchanged at the container exchange station. In some examples, the inventory queue and the shuttle queue are located on different floors of the workspace.

At 1510, the process 1500 instructs removal of the first container from the container holder and placement of the first container on the container shuttle. In some examples, instructing removal and placement of the first container is performed by the inventory module 97. Instructing removal of the first container from the container holder may include providing instructions identifying the first container among the containers of the container holder. In some examples, instructing placement of the first container on the container shuttle may include providing instructions identifying a location on the container shuttle for the first container. As described herein, instructing removal and placement may include providing instructions to a user device, a human operator, and/or an automated operator.

At 1512, the process 1500 instructs removal of a second container from the container shuttle and placement of the second container on the container holder. In some examples, instructing removal and placement of the second container is performed by the inventory module 97. Instructing removal of the second container from the container shuttle may include providing instructions identifying the second container among the containers of the container shuttle. In some examples, instructing placement of the second container on the container holder may include providing instructions identifying a location on the container holder for the second container. As described herein, instructing removal and placement may include providing instructions to a user device, a human operator, and/or an automated operator.

Figure 16:
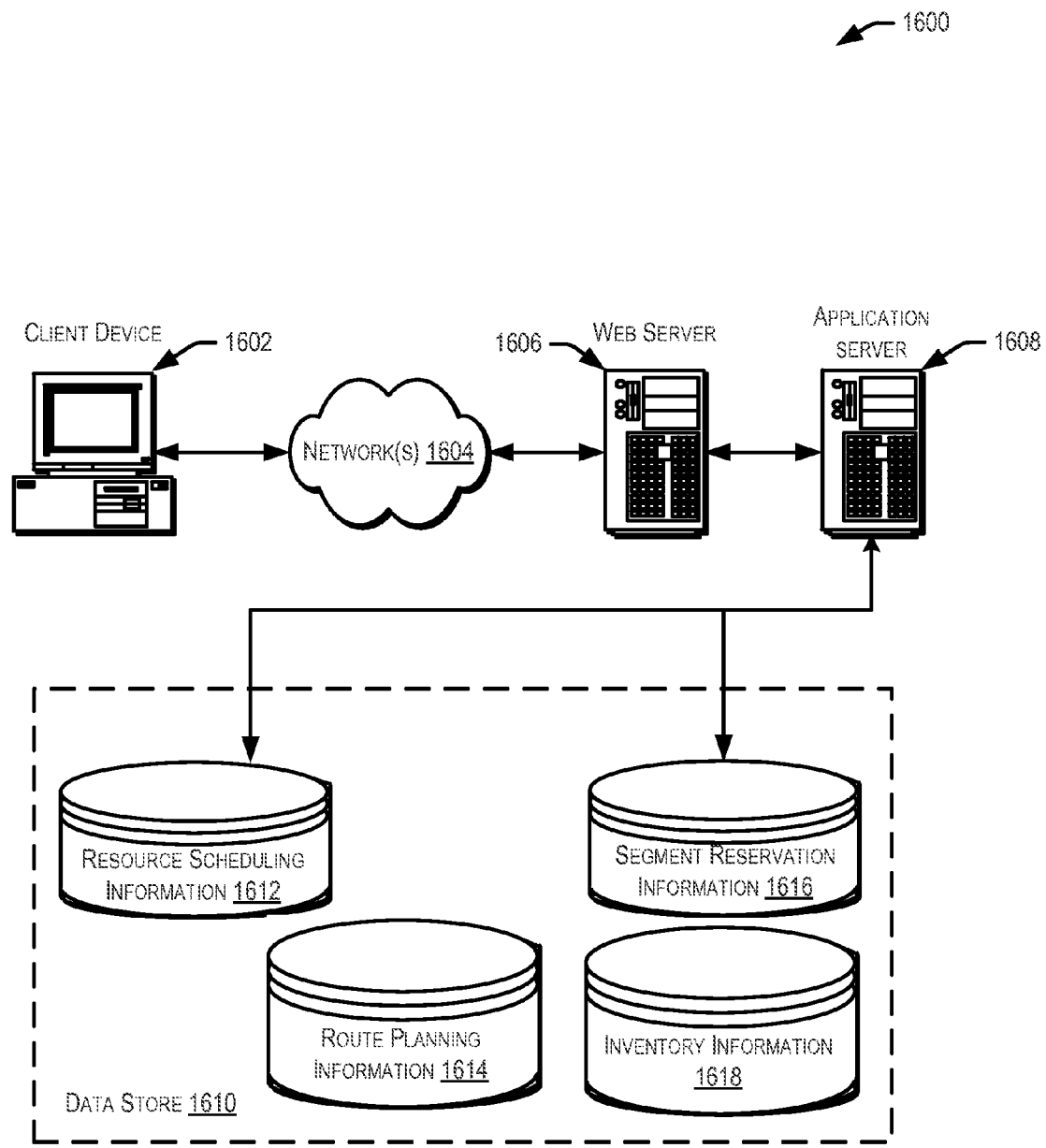
FIG. 16 illustrates an environment in which various features of the inventory system can be implemented, in accordance with at least one embodiment.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing information which can be used by modules described herein, such as resource scheduling information 1612, route planning information 1614, segment reservation information 1616, and/or inventory information 1618. It should be understood that there can be many other aspects that may need to be stored in the data store, such as for page image information and to access right information, which can be stored in any of the above-listed mechanisms as appropriate or in additional mechanisms in the data store 1610. The data store 1610 is operable, through logic associated therewith, to receive instructions from the application server 1608 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server (s) also may be capable of executing programs or scripts in response to requests from user devices, such as by executing one or more Web applications that may be implemented as one or more scripts or programs written in any programming language, such as Java®, C, C# or C++, or any scripting language, such as Per, Python, or TCL, as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents cited herein are hereby incorporated by reference to the same extent as if each reference were individually and specifically indicated to be incorporated by reference and were set forth in its entirety herein.

What is claimed is:

1. A computer-implemented method of managing inventory, the method comprising:
    receiving a customer order for an inventory item;
    identifying, by a processor, a first container stowed in a container holder, the first container holding at least the inventory item;
    instructing, by the processor, a first unmanned mobile drive unit to move the container holder from a storage area of a workspace to an inventory queue of a container exchange station of the workspace, the container holder configured to removably receive one or more containers of a plurality of containers, and each of the plurality of containers configured to receive one or more inventory items;
    instructing, by the processor, a second unmanned mobile drive unit to move a container shuttle from an inventory processing area of the workspace to a shuttle queue of the container exchange station, the container shuttle configured to removably receive one or more other containers of the plurality of containers, the container shuttle configured to receive at least one of: a container holding at least one inbound inventory item identified to be stowed within the storage area of the workspace, or a container holding at least one outbound inventory item identified to be picked at a pick station;
    instructing, by the processor, removal of the first container from the container holder and placement of the first container on the container shuttle at the container exchange station prior to the container shuttle being moved to the pick station; and
    instructing, by the processor, removal of a second container from the container shuttle and placement of the second container on the container holder at the container exchange station prior to the container holder being moved to the storage area, the second container holding at least one inbound inventory item identified to be stowed within the storage area of the workspace.

2. The computer-implemented method of claim 1, wherein instructing removal of the first container from the container holder and placement of the first container on the container shuttle at the container exchange station and instructing removal of the second container from the container shuttle and placement of the second container on the container holder at the container exchange station comprises:
    generating instructions identifying at least the first container and the second container, at least a portion of the instructions being human-readable instructions; and
    providing at least the human-readable instructions to a user device associated with a human operator at the container exchange station.

3. The computer-implemented method of claim 1, wherein instructing removal of the first container from the container holder and placement of the first container on the container shuttle at the container exchange station and instructing removal of the second container from the container shuttle and placement of the second container on the container holder at the container exchange station comprises:
    generating instructions identifying at least the first container and the second container, at least a portion of the instructions being machine-readable instructions; and
    providing at least the machine-readable instructions to an automated operator at the container exchange station, the automated operator configured to remove containers and place containers in accordance with the machine-readable instructions.

4. The computer-implemented method of claim 1, further comprising instructing removal of a third container from the container shuttle and placement of the third container on the container holder at the container exchange station prior to the container holder being moved to the storage area, the third container comprising a transship container placed on the container shuttle at a receiving station, the transship container holding a plurality of inbound inventory items to be stowed within the storage area of the workspace.

5. A computer-implemented method of managing inventory, the method comprising:
    instructing, by the processor, a first mobile drive unit to move a container holder from a storage area of a workspace to an inventory queue of a container exchange station of the workspace, the container holder configured to removably receive one or more containers of a plurality of containers, each of the plurality of containers configured to receive one or more inventory items;
    instructing, by the processor, a second mobile drive unit to move a container shuttle from an inventory processing area of the workspace to a shuttle queue of the container exchange station, the container shuttle configured to removably receive one or more other containers of the plurality of containers;
    instructing, by the processor, removal of a first container from the container holder and placement of the first container on the container shuttle at the container exchange station, the first container holding at least one outbound inventory item; and
    instructing, by the processor, removal of a second container from the container shuttle and placement of the second container on the container holder at the container exchange station, the second container holding at least one inbound inventory item identified to be stowed within the storage area of the workspace.

6. The computer-implemented method of claim 5, further comprising:
    prior to instructing the first mobile drive unit, receiving a customer order for an inventory item; and identifying the inventory item as the at least one outbound inventory item stowed in the first container.

7. The computer-implemented method of claim 5, wherein the first container holds at least one stowed inventory item, the at least one stowed inventory item identified to remain stowed within the storage area of the workspace.

8. The computer-implemented method of claim 7, further comprising:
instructing the second unmanned drive unit to move the container shuttle to an inventory processing station;
instructing removal of the at least one outbound inventory item from the first container at the inventory processing station;
instructing the second unmanned drive unit to move the container shuttle to a receiving station after the at least one outbound inventory item is removed from the first container at the inventory processing station;
instructing placement of at least one inbound inventory item in the first container at the receiving station; and
instructing the second unmanned drive unit to move the container shuttle to the shuttle queue of the container exchange station.

9. The computer-implemented method of claim 8, wherein the container shuttle further comprises a third container holding one or more outbound inventory items, the method further comprising:
instructing removal of at least one of the one or more outbound inventory items from the third container at the inventory processing station; and
instructing placement of at least one inbound inventory item in the third container at the receiving station.

10. The computer-implemented method of claim 5, further comprising:
prior to the second mobile drive unit moving the container shuttle to the shuttle queue of the container exchange station, instructing the second unmanned drive unit to move the container shuttle to a receiving station; and
instructing removal of the at least one inbound inventory item from at least one of a third container or a transship container and placement of the at least one inbound inventory item in the second container.

11. The computer-implemented method of claim 5, wherein the storage area comprises a plurality of container holders holding a plurality of containers filled with inventory items, such that the storage area is a high density storage area.

12. The computer-implemented method of claim 5, wherein the container shuttle holds a third container comprising a transship container placed on the container shuttle at a receiving station and holding a plurality of outbound inventory items identified to be picked at a pick station, and the method further comprises instructing the second mobile drive unit to move the container shuttle to the pick station after the first container is placed on the container shuttle at the container exchange station.

13. The computer-implemented method of claim 5, wherein instructing removal of the first container from the container holder and placement of the first container on the container shuttle at the container exchange station comprises:
instructing removal of the first container from the container holder and placement of the first container on an inventory conveyance system of the container exchange station;
instructing an operator to perform a consolidation operation with respect to the at least one outbound inventory item held within the first container; and
instructing removal of the first container from the inventory conveyance system and placement of the first container on the container shuttle.

14. The computer-implemented method of claim 5, wherein instructing removal of the first container from the container holder and placement of the first container on the container shuttle at the container exchange station and instructing removal of the second container from the container shuttle and placement of the second container on the container holder at the container exchange station comprises:
generating instructions identifying at least the first container and the second container, at least a portion of the instructions being machine-readable instructions; and
providing at least the machine-readable instructions to an automated operator at the container exchange station, the automated operator configured to remove containers and place containers in accordance with the machine-readable instructions.

15. The computer-implemented method of claim 5, wherein the container exchange station comprises an inventory movement device, and wherein at least one of the first container or the second container is placed on the inventory movement device prior to being placed on at least one of the container holder or the container shuttle.

16. A system of managing inventory, the system comprising: a plurality of container holders arranged within a storage area of a workspace, individual container holders of the plurality of container holders configured to removably receive one or more containers of a plurality of containers, and each of the plurality of containers configured to receive one or more inventory items;
a plurality of container shuttles configured to removably receive one or more other containers of the plurality of containers;
a plurality of unmanned mobile drive units, at least some of the unmanned mobile drive units configured to move the plurality of container holders and to move the plurality of container shuttles;
a container exchange station within the workspace, the container exchange station
comprising:
a first queue and a second queue, each queue configured to receive at least:
container holders of the plurality of container holders coupled to unmanned mobile drive units of the plurality of unmanned mobile drive units; and container shuttles of the plurality of container shuttles coupled to other unmanned mobile drive units of the plurality of unmanned mobile drive units; and
an exchange area configured for exchanging containers of the plurality of containers; and
a management module configured to:
instruct movement, by a first unmanned mobile drive unit, of a container holder from the storage area of the workspace to the first queue of the container exchange station;
instruct movement, by a second unmanned mobile drive unit, of a container shuttle from an inventory processing area of the workspace to the second queue of the container exchange station;
instruct removal of the first container from the container holder and placement of the first container on the container shuttle; and
instruct removal of a second container from the container shuttle and placement of the second container on the container holder.

17. The system of claim 16, wherein the management module is further configured to:

receive an order for a first inventory item;

determine a location of the first inventory item, the location identifying the first container and the container holder in which the first inventory item is stowed; and after placement of the first container on the container shuttle, instruct movement, by the second unmanned mobile drive unit, of the container shuttle to a pick station.

18. The system of claim 16, wherein the container exchange station further comprises a third queue, and the management module is further configured to:

instruct removal of a third container from the container shuttle and placement of the third container at a temporary receiving location;

instruct movement, by a third unmanned mobile drive unit, of a second container holder to the third queue of the container exchange station; and instruct removal of the third container from the temporary receiving location and placement of the third container on the second container holder.

19. The system of claim 16, wherein the first queue of the container exchange station is located on a first floor of the workspace and the second queue of the container exchange station is located on a second floor of the workspace, and the exchange area is configured for exchanging the containers between the first floor and the second floor.

20. The system of claim 16, wherein the exchange area is configured for exchanging containers by at least one of a human operator or an automated operator.

* * * * *